(12) United States Patent
Matsuno et al.

(10) Patent No.: US 6,208,929 B1
(45) Date of Patent: Mar. 27, 2001

(54) TORQUE DISTRIBUTION CONTROL APPARATUS FOR 4 WHEEL DRIVEN VEHICLE

(75) Inventors: Koji Matsuno; Yutaka Hiwatashi, both of Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/327,349

(22) Filed: Jun. 5, 1999

(30) Foreign Application Priority Data

Jun. 9, 1998 (JP) .................................................. 10-161055

(51) Int. Cl.[7] ..................................................... B60T 7/12
(52) U.S. Cl. ................................. 701/89; 701/70; 701/72; 180/197; 180/233; 180/248; 203/121
(58) Field of Search .................................. 701/41, 48, 69, 701/70, 87, 81, 89, 72; 180/197, 233, 244, 248; 303/121, 143, 190

(56) References Cited

U.S. PATENT DOCUMENTS 4,989,686 * 2/1991 Miller et al. .......................... 180/197
5,862,503 * 1/1999 Eckert et al. ........................... 701/78

FOREIGN PATENT DOCUMENTS 270561    3/1990   (JP) .

* cited by examiner

Primary Examiner—William A. Cuchlinski, Jr.
Assistant Examiner—Yonel Beaulieu
(74) Attorney, Agent, or Firm—Martin A. Farber

(57) ABSTRACT

In the case that a brake controller is installed to a 4 wheel driven vehicle, braking force control should be carried out effectively enough so that running stability of the vehicle can be up-graded at cornering. The brake controller 40 calculates differential value of aimed yaw rate, differential value of predicted yaw rate on low friction road and deflection of the two differential values. And also it calculates deflection of real yaw rate and aimed yaw rate. Then the brake controller 40 determines aimed braking force and applies the aimed braking force to a selected wheel to carry out braking control. The torque distribution controller 70 receives control parameters and signals of status of brake control and carries out torque distribution control based on the parameters and signals through the hydraulic multi-plate clutch 21. The hydraulic multi-plate clutch 21 is so controlled with certain weak engaging force as to make each wheel rotate freely, when braking control is carried out by applying braking force to a selected wheel. Thus the brake controller 40 can perform as aimed.

9 Claims, 22 Drawing Sheets

TORQUE DISTRIBUTION CONTROL APPARATUS FOR 4 WHEEL DRIVEN VEHICLE

BACKGROUND OF THE INVENTION

This invention relates to a torque distribution apparatus for a 4 wheel driven vehicle equipped with a braking force controlling means for applying a braking force to an appropriate wheel to up-grade vehicle stability at cornering.

Recently developed and put into practical use are braking force controllers applying a braking force to an appropriate wheel to up-grade vehicle stability at cornering referring to influence of forces applied to a vehicle while cornering.

For example, the Japanese Patent Laid-open No. 70561/1990 disclosed a brake control device carrying out controls according to yaw rate, i.e., angular velocity of yawing which is rotary motion around plumb axis passing through a gravity center of a vehicle. In this technology, aimed yaw rate and real yaw rate of the vehicle are compared to determine vehicle dynamic characteristics as under steering or over steering against aimed yaw rate. And then a corrective braking force is applied to an inner wheel when judged as under steering or to an outer wheel when judged as over steering so that real yaw rate becomes equal to aimed yaw rate. Thus the vehicle running stability is up-graded.

Beside the above, disclosed for 4 wheel driven vehicles are various kinds of driving torque distribution devices, which can control torque distribution between front and rear wheels by appropriately controlling differential of front and rear wheel rotations in order to up-grade vehicle running stability.

Well known as a torque distribution device mentioned above is a limited slip center differential to be installed on a full time 4 wheel driven vehicle, wherein slippage of torque distribution clutch (transfer clutch) is controlled.

When the brake control device applies a braking force selectively to a wheel for up-grading vehicle stability in a 4 wheel driven vehicle equipped with the limited slip center differential, so strong engagement of the torque distribution clutch brings difficulty in precise application of the braking force as calculated. The reason is that each wheel can not rotate freely due to the strong engagement of the clutch that creates nearly mechanical connection of respective wheels.

SUMMARY OF THE INVENTION

The present invention provides a torque distribution control apparatus for a 4 wheel driven vehicle equipped with a brake control device, which can carry out braking force controlling properly and effectively enough in a 4 wheel drive mechanism for up-grading vehicle stability at cornering.

In order to achieve the above object, the torque distribution apparatus for 4 wheel driven vehicle according to claim 1 of the present invention is to control distribution of driving torque to front and rear wheels of a 4 wheel driven vehicle equipped with a braking force controlling means for controlling a selective application of a braking force to a wheel for controlling vehicle movement by calculations based on vehicle dynamic conditions, the torque distribution control apparatus being characterized in reducing driving torque to either front or rear wheels at the application of the braking force to the wheel by the braking force controlling means.

The vehicle equipped with the torque distribution apparatus for 4 wheel driven vehicle according to claim 1 controls the selective application of the braking force to the wheel for controlling vehicle movement by calculations based on vehicle dynamic conditions. And the torque distribution control apparatus controls driving torque distribution by reducing delivered torque to either front or rear wheels so that the braking force can be applied as calculated at the operation of the braking force controlling means.

The torque distribution apparatus for 4 wheel driven vehicle according to claim 2 of the present invention is to control distribution of driving torque to front and rear wheels of a 4 wheel driven vehicle equipped with a braking force controlling means for controlling a selective application of a braking force to a wheel for controlling vehicle movement by calculations based on vehicle dynamic conditions, the torque distribution control apparatus being characterized in controlling torque distribution to front and rear wheels in an aimed distribution ratio equal to weight distribution of the vehicle at the application of the braking force to the wheel by the braking force controlling means.

The vehicle equipped with the torque distribution apparatus for 4 wheel driven vehicle according to claim 2 controls the selective application of the braking force to the wheel for controlling vehicle movement by calculations based on vehicle dynamic conditions. And the torque distribution control apparatus controls torque distribution to front and rear wheels in an aimed distribution ratio equal to weight distribution of the vehicle at the application of the braking force to the wheel by the braking force controlling means. Namely, limiting of slippage in a limited slip center differential is controlled for the 4 wheel driven vehicle to play in full traction performance and driving stability so that up-grading of vehicle stability and performance of 4 wheel drive are kept in optimum conditions.

A torque distribution control apparatus for 4 wheel driven vehicle according to claim 3 is to control distribution of driving torque to front and rear wheels of a 4 wheel driven vehicle equipped with a braking force controlling means for controlling a selective application of a braking force to a wheel for controlling vehicle movement by calculations based on vehicle dynamic conditions, the torque distribution control apparatus being characterized in modifying at least one of torque transmissions to front and rear wheels according to turning characteristic change as a result of the application of the braking force to the wheel by the braking force controlling means.

The vehicle equipped with the torque distribution apparatus for 4 wheel driven vehicle according to claim 3 controls the selective application of the braking force to the wheel for controlling vehicle movement by calculations based on vehicle dynamic conditions. And the torque distribution control apparatus modifies at least one of torque transmissions to front and rear wheels according to turning characteristic change as a result of the application of the braking force to the wheel by the braking force controlling means. Namely, the turning characteristic change can be done effectively by the braking force controlling means.

The torque distribution control apparatus for 4 wheel driven vehicle according to claim 4 is the torque distribution control apparatus for 4 wheel driven vehicle according to claim 3, being characterized in modifying torque transmission to the rear wheels toward increasing at changing turning characteristics to those favorable to turn as a result of the application of the braking force to the wheel by the braking force controlling means. Namely, the turning characteristic change to those favorable to turn can be done effectively by the braking force controlling means.

The torque distribution control apparatus for 4 wheel driven vehicle according to claim 5 is the torque distribution control apparatus for 4 wheel driven vehicle according to claim 4, being characterized in increasing torque distribution ratio to the rear wheels to a predetermined value at changing turning characteristics to those favorable to turn as a result of the application of the braking force to the wheel by the braking force controlling means. Namely, the turning characteristic change to those favorable to turn can be done effectively by the braking force controlling means.

The torque distribution control apparatus for 4 wheel driven vehicle according to claim 6 is the torque distribution control apparatus for 4 wheel driven vehicle according to claim 4, being characterized in modifying torque transmission to the rear wheels toward increasing according to deflection of real yaw rate and aimed yaw rate at changing turning characteristics to those favorable to turn as a result of the application of the braking force to the wheel by the braking force controlling means. Namely, the turning characteristic change to those favorable to turn can be done effectively by the braking force controlling means.

The torque distribution control apparatus for 4 wheel driven vehicle according to claim 7 is the torque distribution control apparatus for 4 wheel driven vehicle according to claim 3, being characterized in modifying torque transmission to the front wheels toward increasing at changing turning characteristics to those unfavorable to turn as a result of the application of the braking force to the wheel by the braking force controlling means. Namely, the turning characteristic change to those unfavorable to turn can be done effectively by the braking force controlling means.

The torque distribution control apparatus for 4 wheel driven vehicle according to claim 8 is the torque distribution control apparatus for 4 wheel driven vehicle according to claim 7, being characterized in increasing torque distribution ratio to the front wheels to a predetermined value at changing turning characteristics to those unfavorable to turn as a result of the application of the braking force to the wheel by the braking force controlling means. Namely, the turning characteristic change to those unfavorable to turn can be done effectively by the braking force controlling means.

The torque distribution control apparatus for 4 wheel driven vehicle according to claim 9 is the torque distribution control apparatus for 4 wheel driven vehicle according to claim 7, being characterized in modifying torque transmission to the front wheels toward increasing according to deflection of real yaw rate and aimed yaw rate at changing turning characteristics to those unfavorable to turn as a result of the application of the braking force to the wheel by the braking force controlling means. Namely, the turning characteristic change to those unfavorable to turn can be done effectively by the braking force controlling means.

DETAILED DESCRIPTION OF PREFERRED EMBODIMENTS

Preferred embodiments of the present invention are described according to the accompanied drawings. FIG. 1 through FIG. 8 showing the first embodiment of the present invention.

A vehicle used for explanation of the first embodiment of the present invention is a type of 4-wheel-driven with a center differential of compound type planetary gear and an automatic transmission.

Figure 1:
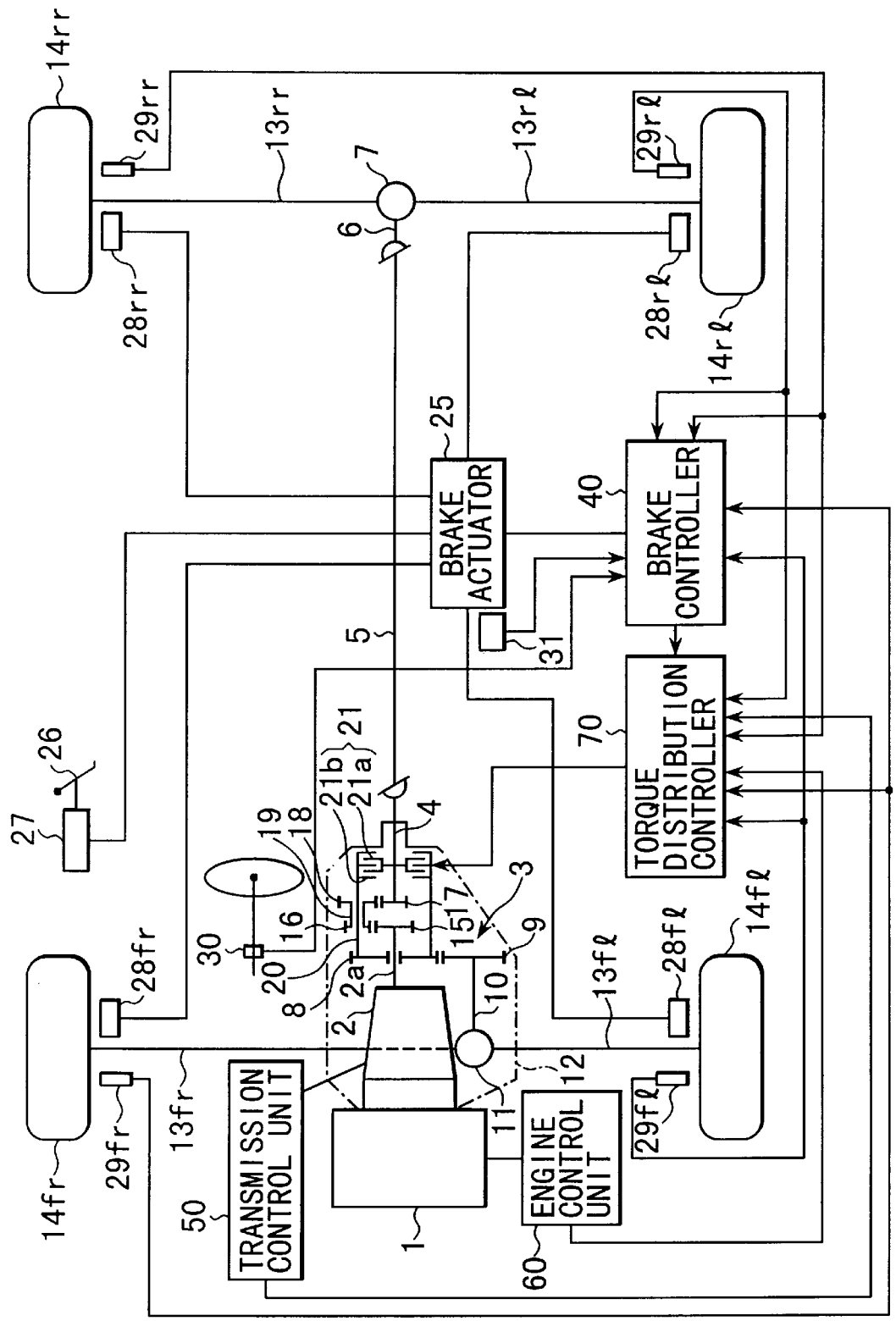
FIG. 1 is an illustration showing an overall construction of a 4 wheel driven vehicle equipped with a torque distribution apparatus according to the $1^{st}$ embodiment of the present invention.

Referring to FIG. 1, driving force, generated by an engine 1 installed in front of a vehicle, is transmitted to a torque converter and an automatic gear train 2 located next to the engine 1, and transmitted further to a center differential 3 through an output shaft 2a. The driving force is delivered to a rear differential 7 through a rear drive shaft 4, a propeller shaft 5 and a drive pinion 6 in order and also delivered to a front differential 11 through a transfer drive gear 8, a transfer driven gear 9 and a front drive shaft 10 comprising a drive pinion. The torque converter, the automatic gear train 2, the center differential 3 and the front differential 11 are integrally accommodated in a case 12.

The driving force inputted to the rear differential 7 is transmitted to a left rear wheel 14rl through a left rear drive shaft 13rl and also transmitted to a right rear wheel 14rr through a right rear drive shaft 13rr. The driving force inputted to the front differential 11 is transmitted to a left front wheel 14fl through a left front drive shaft 13fl and also transmitted to a right front wheel 14fr through a right front drive shaft 13fr.

The center differential 3 comprises a first and a second gear trains. A first sun gear 15 having a relatively large diameter engages with a plurality of first pinions 16 having a relatively small diameter each, forming the first gear train. The first sun gear 15 is formed on the output shaft 2a transmitting the driving force to the center differential 3.

A second sun gear 17 having a relatively small diameter engages with a plurality of second pinions 18 having a relatively large diameter each, forming the second gear train. The second sun gear 17 is formed on the rear drive shaft 4 transmitting the driving force to the rear wheels.

The first pinion 16 and the second pinion 18 are formed on a pinion member 19 in unit. A plurality of the pinion members 19, e.g., 3(three), are rotatably supported by fixed shafts which are part of a carrier 20.

The front end of the carrier 20 is connected to the transfer drive gear 8, transmitting the driving force to the front wheels.

In the carrier 20, the output shaft 2a is rotatably installed from the front side and the rear drive shaft 4 is rotatably installed from the back side. Thus the carrier 20 accommodates the first sun gear 15 and the second sun gear 17 in its center part, the first sun gear 15 and the second sun gear 17 engaging with a plurality of the first and the second pinions 16 and 18 of pinion members 19 respectively.

Thus a compound type planetary gear without ring gear is formed. The first sun gear 15 (input) engaging the first pinions 16 distributes driving force to one output through the second pinions 18 and the second sun gear 17 and to the other output through the pinion members 19 and the carrier 20.

The center differential 3, which is the compound type planetary gear, is capable of differential function by appropriately setting tooth numbers of the first and second sun gears, 15 and 17, and pluralities of the first and second pinions, 16 and 18, of which allocations are so arranged to surround the sun gears, 15 and 17, respectively.

The center differential 3 of such a compound type planetary gear is also capable of setting its torque distribution ratio with desirable value by appropriately setting intermeshing pitch circle diameters of the first and second pinions, 16 and 18, and the first and second sun gears, 15 and 17, respectively.

Further, the center differential 3 has a differential limiting function in itself by creating a differential limiting torque in proportion to strength of input torque due to two kinds of friction forces between the pinion members 19 and the carrier 20. One is friction torque occurs at edges of pinion members 19 due to residual thrust force which is a result of counter balancing of respective thrust forces generated on the first gear train and the second gear train by making the first sun gear 15/pinions 16 and second sun gears 17/pinions 18 in such configurations that the gears generate opposite and different thrust forces, for example by employing helical gears with different helix angles for the first gear train and the second gear train respectively.

The other is friction torque occurs at the axis hole of pinion members 19 due to pressing force against the fixed shaft of the carrier 20 by composite of repulsive force and tangential force caused by engagements of the first and second sun gears, 15 and 17, and the first and second pinions, 16 and 18.

Two output members of the center differential 3, i.e., the carrier 20 and the second sun gear 17 are indirectly connected by a hydraulic multi-plate clutch (transfer clutch) 21 which is a variable torque distribution clutch controlled by a torque distribution controller 70.

The hydraulic multi-plate clutch (transfer clutch) 21 consists of a plurality of driven plates 21a installed on the rear drive shaft 3 having the second sun gear 17 in unit and a plurality of drive plates 21b installed to the carrier 20, while the driven plates 21a and the drive plates 21b are put alternately. The hydraulic multi-plate clutch (transfer clutch) 21 is pressed or released by a piston (not shown) and a pressure plate (not shown) which are installed on the case 12 and operated by hydraulic pressure in a hydraulic pressure chamber (not shown) hydraulically connected to a hydraulic device (not shown) controlled by the torque distribution controller 70.

In the case that the hydraulic multi-plate clutch (transfer clutch) 21 is open, the driving force is distributed in the specified ratio as it is set by the center differential 3. In the case that the hydraulic multi-plate clutch (transfer clutch) 21 is completely engaged, the differential function becomes inoperative, i.e., directly coupled so that the specified distribution ratio is canceled.

Pressing force, i.e., transfer torque applied to the hydraulic multi-plate clutch (transfer clutch) 21, is controlled by the torque distribution controller 70 so that the torque distribution ratio can vary from the ratio specified by the center differential, e.g., front 35/rear 65, to the ratio when directly coupled, e.g., front 50/rear 50. Thus torque distribution control, i.e. power distribution control, is established.

A brake actuator 25 is hydraulically connected to a master cylinder 27 connected to a brake pedal 26 which is operated by a driver. When the driver depresses the brake pedal 26, the master cylinder 27 pressurizes brake fluid. And brake pressure is delivered to a front left wheel cylinder 28fl, a front right wheel cylinder 28fr, a rear left wheel cylinder 28rl and a rear right wheel cylinder 28rr, through the brake actuator 25 so that braking forces are applied to the 4 wheels 14fl, 14fr, 14rl and 14rr.

The brake actuator 25, a hydraulic unit comprising a pressurizing device, reducing valves and intensifiers, can apply brake pressure to the wheel cylinders 28fl, 28fr, 28rl and 28rr respectively, independently and controllably corresponding to input signals.

The wheels 14fl, 14fr, 14rl and 14rr are provided with a front left wheel speed sensor 29fl, a front right wheel speed sensor 29fr, a rear left wheel speed sensor 29rl and a rear right wheel speed sensor 29rr respectively so that each wheel speed is determined. And steering wheel of the vehicle is provided with a steering wheel angle sensor 30 to detect steering wheel angle.

A yaw rate sensor 31 is provided to send signal to a brake controller 40 which receives signals from the wheel speed sensors 29fl, 29fr, 29rl and 29rr and the steering angle sensor 30 as well. The brake controller 40 outputs signals to the brake actuator 25, while selecting a wheel and calculating a braking force to be applied to the wheel for rectifying vehicle running posture to an aimed one. Thus the braking force controlling means is composed.

Figure 6:
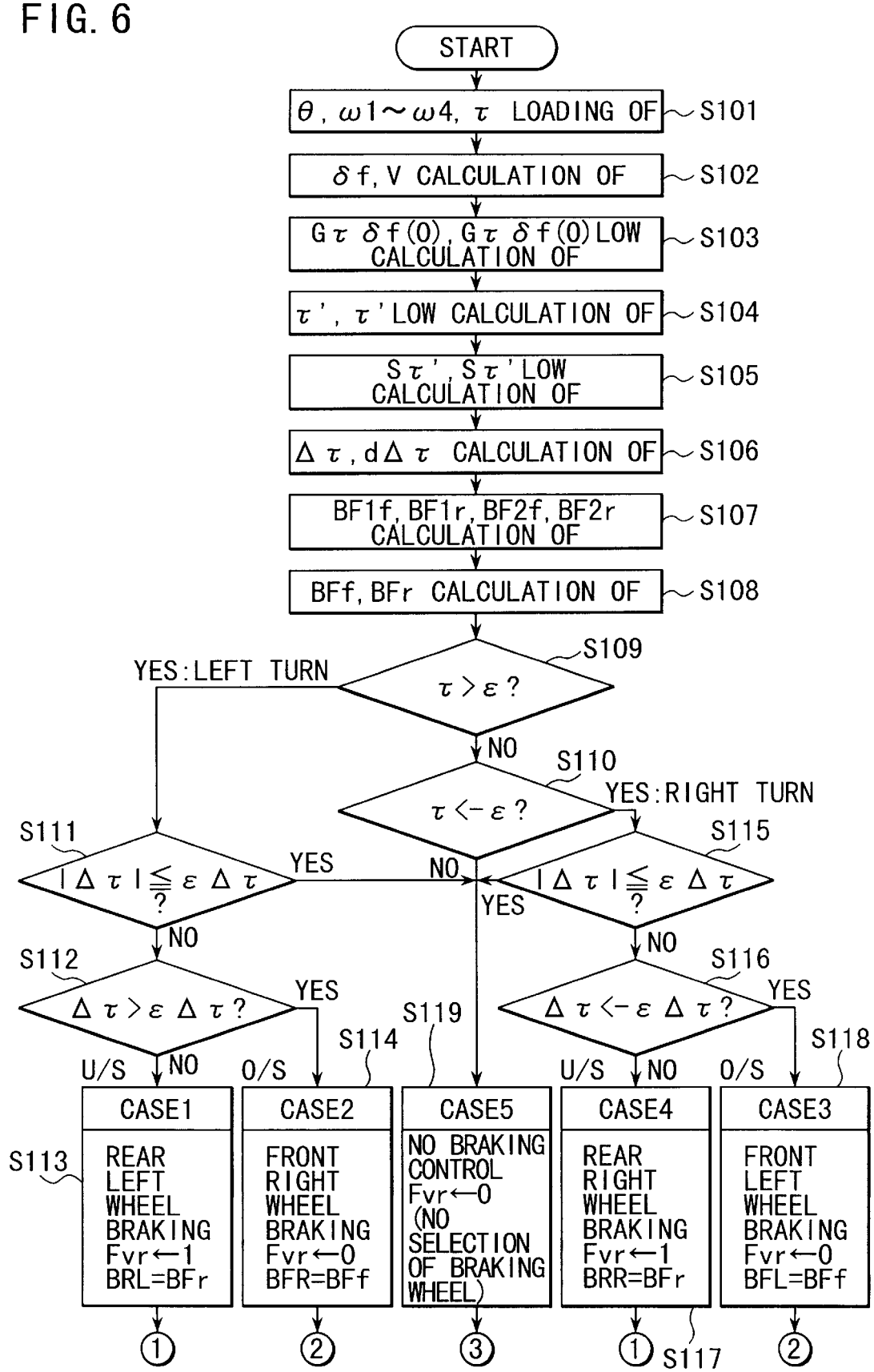
FIG. 6 is a flow chart showing braking force control according to the $1^{st}$ embodiment of the present invention.
Figure 7:
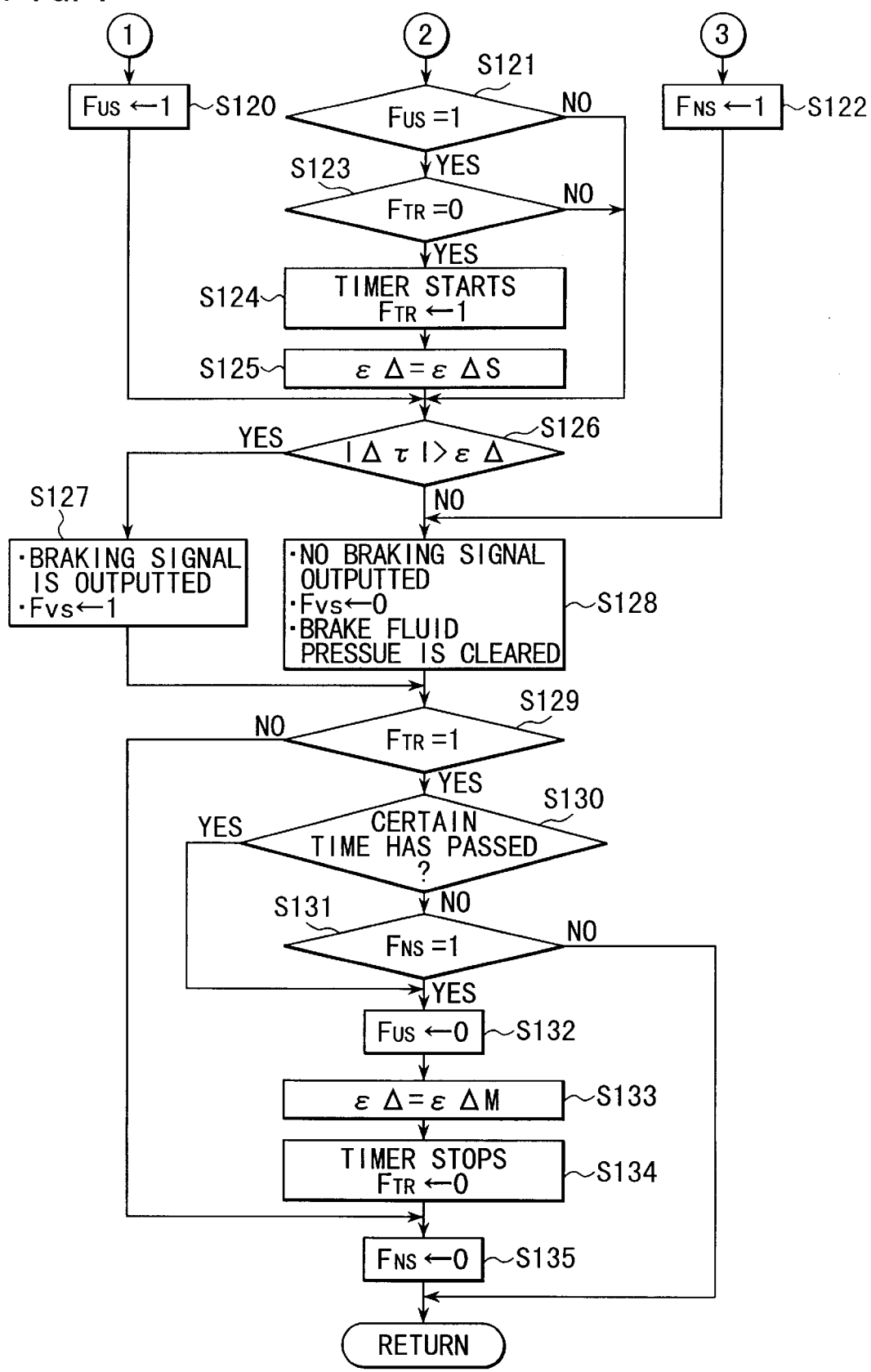
FIG. 7 is a flow chart continued from FIG. 6.

The brake controller 40 carries out braking controls according to the flow chart shown in FIG. 6 and FIG. 7. The braking control program is carried out in a predetermined interval, e.g., 10 ms.

The program starts with S101 (S means step). At S101, steering wheel angle θ, wheel speeds ω1, ω2, ω3 and ω4 and real yaw rate γ are inputted from the steering wheel sensor 30, the wheel speed sensors 29fl, 29fr, 29rl and 29rr and the yaw rate sensor 31, then the program goes to S102.

At S102, real steering angle δf is calculated, dividing steering wheel angle θ by steering gear ratio N, namely δf=θ/N, and vehicle speed V is determined from wheel speeds ω1, ω2, ω3 and ω4 in a predetermined manner, e.g., V is an average of ω1, ω2, ω3 and ω4.

Then the program goes to S103, where aimed yaw rate regular gain Gγδf(0) is calculated by formula (1) and predicted yaw rate regular gain Gγδf(0)LOW is calculated by formula (3).

Aimed yaw rate regular gain Gγδf(0) is yaw rate value corresponding to real steering angle δf at turning along a constant circle. Aimed yaw rate regular gain Gγδf(0) is determined by the following formula;

$$G\gamma\delta f(0)=1/(1+Ao\times V^2)\times V/L \qquad (1)$$

wherein, L is a wheel base and Ao is a stability factor calculated from vehicle specifications by the following formula;

$$Ao=(-m\times(Lf\times CPf-Lr\times CPr))/(2\times L^2\times CPf\times CPr) \qquad (2)$$

wherein, m is vehicle mass, Lf is distance from the front wheel axis to the center of gravity of the vehicle , Lr is distance from the rear wheel axis to the center of gravity of the vehicle, CPf is front equivalent cornering power and CPr is rear equivalent cornering power.

Predicted yaw rate regular gain Gγδf(0) LOW is predicted yaw rate value when the vehicle turns along a constant circle with real steering angle δf on low friction road. Predicted yaw rate regular gain Gγδf(0) LOW is given by the following formula;

$$G\gamma\delta f(0)LOW=1/(1+AOLOW\times V^2)\times V/L \qquad (3)$$

Wherein, AOLOW is stability factor in running on low friction road determined by the vehicle specifications and given by the following formula;

$$AOLOW=(-m\times(Lf\times CPfLOW-Lr\times CPrLOW)/(2\times L^2\times CPfLOW\times CPrLOW) \qquad (4)$$

wherein, CPfLOW is front equivalent cornering power on low friction road and CPrLOW is rear equivalent cornering power on low friction road.

The program further goes to S104, where aimed yaw rate γ' is calculated based on real steering angle δf and aimed yaw rate regular gain Gγδf(0) , counting response delay of the vehicle movement, and predicted yaw rate on low friction road γ' LOW is calculated based on real steering angle δf and predicted yaw rate regular gain Gγδf(0) LOW, counting response delay of the vehicle movement.

Aimed yaw rate γ' is calculated by the following formula;

$$\gamma'=1/(1+T\cdot s)\times G\gamma\delta f(0)\times\delta f \qquad (5)$$

wherein, T is time constant and s is Laplace operator. The above formula (5) includes response delay of the vehicle movement expressed by $1^{st}$ order approximation, which is to be given in $2^{nd}$ order otherwise. And time constant T is determined, for example by the following formula;

$$T=m\times Lf\times V/2\times L\times CPr \qquad (6)$$

Predicted yaw rate on low friction road γ' LOW is determined by the following formula;

$$\gamma'LOW=1/(1+TLOW\cdot s)\times G\gamma\delta f(0)LOW\times\delta f \qquad (7)$$

wherein, TLOW is time constant.

The above formula (7) includes response delay of the vehicle movement expressed by $1^{st}$ order approximation, which is to be given in $2^{nd}$ order otherwise. And time constant TLOW is determined, for example by the following formula;

$$TLOW=m\times Lf\times V/2\times L\times CPrLOW \qquad (8)$$

The program goes to S105, where aimed yaw rate differential Sγ' which is differential value of the aimed yaw rate γ' and predicted yaw rate differential Sγ' LOW which is differential value of predicted yaw rate γ'LOW are calculated. And then goes to S106.

At S106, calculated are yaw rate differential deflection dΔγ(=Sγ'LOW−Sγ') which is deflection of aimed yaw rate differential Sγ' and predicted yaw rate differential Sγ'LOW and yaw rate deflection Δγ(=γ−γ')

Then the program goes to S107, where first aimed pressures BF1f and BF1r ( first front wheel aimed pressure BF1f and first rear wheel aimed pressure BF1r) are calculated by formulas (9) and (10) and second aimed pressures BF2f and BF2r (second front wheel pressure BF2f and second rear wheel pressure BF2r) are calculated by formulas (11) and (12).

First front wheel aimed pressure BF1f and first rear wheel aimed pressure BF1r are calculated based on yaw rate differential deflection dΔγ referring to vehicle specifications. First front wheel aimed pressure BF1f and first rear wheel aimed pressure BF1r are determined by the following formulas;

$$BF1f=G1\times d\Delta\gamma\times Iz/(df/2) \qquad (9)$$

$$BF1r=G1\times G2\times d\Delta\gamma\times Iz/(dr/2) \qquad (10)$$

Wherein, G1 and G2 are gains (e.g., 0.05 and 0.15 respectively) , Iz is yaw inertia moment of the vehicle, df is front tread and dr is rear tread.

In formula (9) , G1 is first large gain and dΔγ×Iz/(df/2) is a part showing first theoretical braking force for the front wheels. In formula (10), G1×G2 is first small gain and dΔγ×Iz/(dr/2) is a part showing first theoretical braking force for the rear wheels. In order to prevent from loosing stability caused by side slips occurring on rear wheel or to prevent from feeling of unstableness given by unexpectedly strong turning moment occurring when the rear wheels are braked, especially on low friction road, first rear wheel aimed pressure BF1r is made so smaller by multiplying the first theoretical braking force for the rear wheels with the first small gain.

As described above, first aimed pressures BF1f and BF1r derived based on yaw rate differential deflection dΔγ are values which are calculated supposing that the vehicle runs on low friction road. The reason why supposing low friction road running is that the more braking controls are needed, the lower road friction is. The respective specified values applicable on low friction road have been determined from data obtained by experiments using vehicle models or by well known theoretical calculations.

Second front wheel aimed pressure BF2f and second rear wheel aimed pressure BF2r are calculated based on running conditions of the vehicle and yaw rate deflection referring to vehicle specifications. Second aimed pressures BF2f and BF2r are determined by the following formula;

$$BF2f = G3 \times (\Delta A \times 4 \times L^2 \times CPf \times CPr \times V)/((CPf + CPr)/df) \times \gamma \quad (11)$$

$$BF2r = G3 \times G4 \times (\Delta A \times 4 \times L^2 \times CPf \times CPr \times V)/((CPf + CPr)/dr) \times \gamma \quad (12)$$

wherein, G3 (e.g.,8.0) and G4 (e.g., 0.15) are gains (e.g., 0.05 and 0.15 respectively) and ΔA is determined by the following formula;

$$\Delta A = (\delta f/(G\gamma \delta f(0) \times \delta f + \Delta \gamma) - 1/G\gamma \delta f(0))/(L \times V) \quad (13)$$

In the above formula (13), Δγ may be further corrected considering side slip angle α which is made by vehicle proceeding direction and vehicle longitudinal axis.

The above mentioned G3 and G4 are gains which are set with same reason as G1 and G2 previously mentioned. In the formula (11), G3 is second large gain and the other part represents second theoretical braking force for the front wheels. In the formula (12), G3×G4 is second small gain and the other represents second theoretical braking force for the rear wheels. Accordingly strength of barking forces to the rear wheels are also repressed by formulas (11) and (12). Repression of braking forces applied to rear wheels is done finely by setting respective gains of G1 through G4 so that the driver does not feel unusual vehicle movement and running stability is up-graded.

The program goes to S108 where final aimed pressures BFf and BFr are calculated by adding first aimed pressures BF1f and BF1r and second aimed pressures BF2f and BF2r respectively.

$$BFf = BF1f + BF2f \quad (14)$$

$$BFr = BF1r + BF2r \quad (15)$$

Namely, the brake controller 40 is to upgrade response and followability by eliminating control delays by corrections which are made under conditions supposing that the vehicle runs on low friction load. As the calculation of differential operations uses predetermined values of a vehicle model instead of values which are to be calculated from actual yaw rate signals, large enough and precise corrections are available.

S109 through S119 are processes of wheel selection by the brake controller 40, i.e., which wheel is to be braked. (+) Positive values of real yaw rate γ and aimed yaw rate γ' are given for the direction of left turning and (−) minus ones for the direction of right turning.

At S109, it is judged if real yaw rate γ is larger than ϵ, a small and positive figure close to 0, predetermined by experiments or calculation, namely in left tuning with a large enough turning radius. If not, when real yaw rate γ is smaller than or equal to ϵ, the program goes to S110 where it is judged if real yaw rate γ is smaller than −ϵ, namely in right turning with large enough turning radius.

When real yaw rate γ is in a range (ϵ≧γ≧−ϵ) namely it is judged that the vehicle is not in right turning with large enough turning radius at S110, the program goes to S119. At S119, this is the case of going straight in FIG. 2, the wheel selection is cancelled and no braking is applied, i.e., rear wheel braking selection flag Fvr is cleared (Fvr←0).

When it is judged at S109 that the vehicle is in left turning with large enough turning radius, i.e., γ>ϵ, the program goes to S111. At S111, yaw rate deflection Δγ is compared to ϵΔγ which is a small and positive figure (close to 0) predetermined by experiments or calculation and judgement is made if the vehicle is in almost neutral steering condition, i.e., |Δγ|≦ϵΔγ namely Δγ is nearly 0.

When it is judged at S111 that the vehicle is in almost neutral steering condition, i.e., |Δγ|≦ϵΔγ, the program goes to S119. Otherwise, i.e., in tendencies of under steering or over steering, it goes to S112.

At S112, it is judged if the vehicle is in under steering or in over steering condition, i.e., Δγ<−ϵΔγ or Δγ>ϵΔγ. When the condition is Δγ<−ϵΔγ and sign of yaw rate deflection Δγ is different from that of real yaw rate γ and negative, judgement is under steering against aimed yaw rate γ' and then the program goes to S113. When the condition is Δγ>ϵΔγ and sign of yaw rate deflection Δγ is same as that of real yaw rate γ and positive, judgement is over steering against aimed yaw rate γ' and then the program goes to S114.

Figure 2:
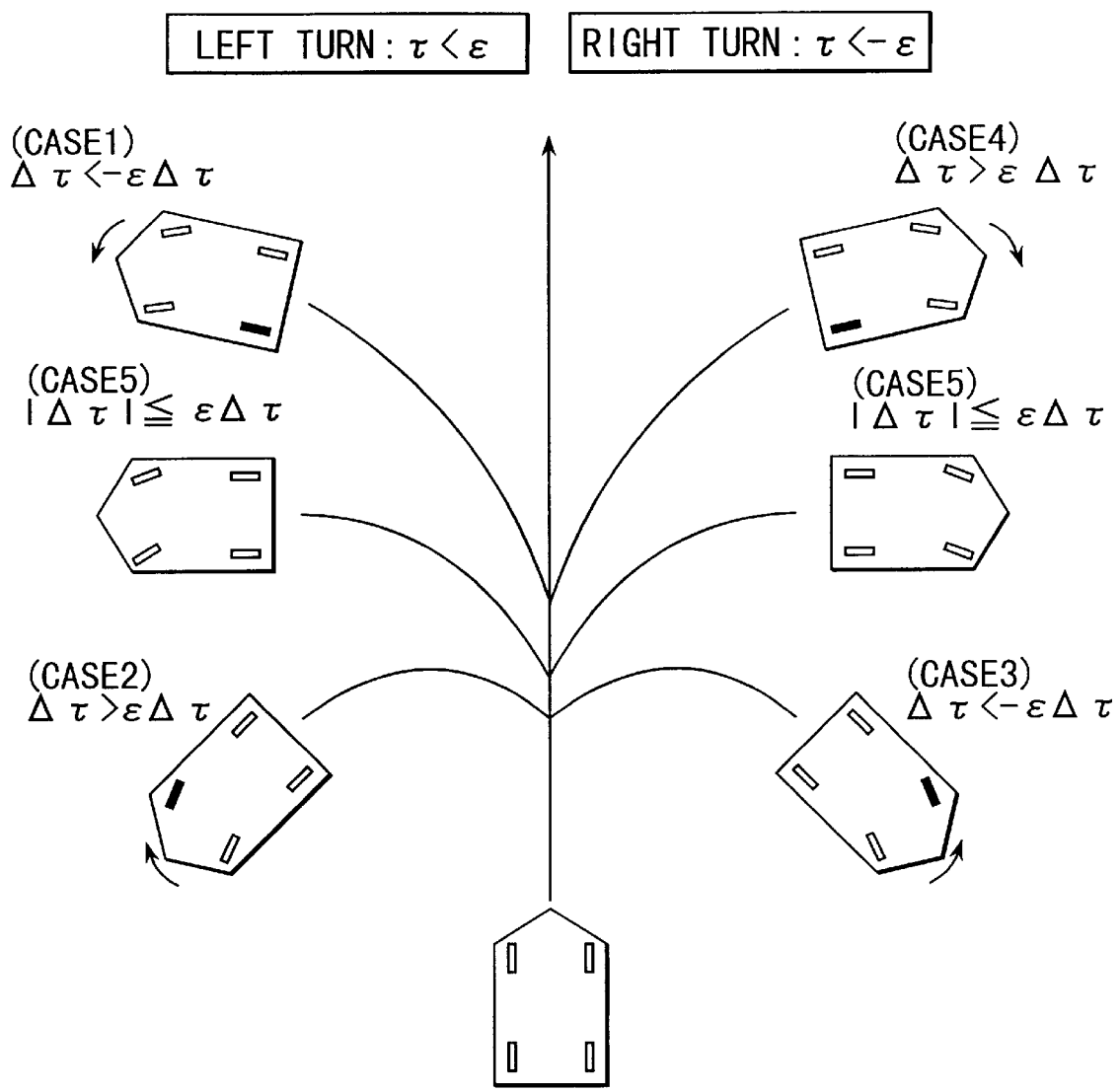
FIG. 2 is an illustration showing vehicle movements by the braking force control according to the $1^{st}$ embodiment of the present invention.

At S113, this is case 1 of FIG. 2, the rear left wheel 14rl is selected for brake application with final aimed rear pressure BFr (rear left wheel pressure BRL=BFr) determined at S108 and rear wheel braking selection flag Fvr is established (Fvr←1).

At S114, this is case 2 of FIG. 2, the front right wheel 14fr is selected for brake application with final aimed front pressure BFf (front right wheel pressure BFR=BFf) determined at S108 and rear wheel braking selection flag Fvr is cleared (Fvr←0).

When it is judged that the vehicle is in right turning with large enough turning radius at S110, i.e., γ<−ϵ, the program goes to S115. At S115, yaw rate deflection Δγ is compared to ϵΔγ, in order to judge if the vehicle is in almost neutral steering condition, i.e., |Δγ|≦ϵΔγ namely Δγ is nearly 0.

When it is judged at S15 that the vehicle is in almost neutral steering condition, i.e., |Δγ|≦ϵΔγ, the program goes to S119. Otherwise, i.e., in tendencies of under steering or over steering, it goes to S116.

At S116, it is judged if the vehicle is in under steering or in over steering condition, i.e., Δγ>ϵΔγ or Δγ<ϵΔγ. When the condition is Δγ>ϵΔγ and sign of yaw rate deflection Δγ is different from that of real yaw rate γ and positive, judgement is under steering against aimed yaw rate γ' and then the program goes to S117. When the condition is Δγ<−ϵΔγ and sign of yaw rate deflection Δγ is same as that of real yaw rate γ and negative, judgement is over steering against aimed yaw rate γ' and then the program goes to S118.

At S117, this is case 4 of FIG. 2, the rear right wheel 14rr is selected for brake application with final aimed rear pressure BFr (rear right wheel pressure BRR=BFr) determined at S108 and rear wheel braking selection flag Fvr is established (Fvr←1).

At S118, this is case 3 of FIG. 2, the front left wheel 14fl is selected for brake application with final aimed rear pressure BFf (front left wheel pressure BFL=BFf) determined at S108 and rear wheel braking selection flag Fvr is cleared (Fvr←0).

At S119 following S110, S111 or S119, this is case 5 of FIG. 2, the selection is cancelled and no braking is applied, i.e., rear wheel braking selection flag Fvr is cleared (Fvr←0).

Thus, during steps of S109 through S119, a wheel for braking application is selected to change turning characteristics when the vehicle is neither in straight running nor in neutral steering condition. An inner rear wheel is selected for application of braking when changing turning characteristics to those favorable to turn, namely when signs of real yaw rate γ and yaw rate deflection Δγ are different each other, i.e., under steering. An outer front wheel is selected for application of braking when changing turning characteristics to those unfavorable to turn, namely when signs of real yaw rate γ and yaw rate deflection Δγ are same, i.e., over steering.

At S113 or S117, under steering is modified to turning characteristics favorable to turn and then the program goes to S120.

At S114 or S118, over steering is modified to turning characteristics unfavorable to turn and then the program goes to S121.

From S119, the program goes to S122.

At S120, under steering pass flag Fus is established (Fus←1). Then the program goes to S126.

Flag Fus shows the vehicle has passed under steering condition and flag Fus is to be cleared (Fus←0) after a threshold setting timer counts a certain time or when turning characteristics changes to neutral from over steering.

At S121, it is judged if under steering pass flag Fus is established (Fus←1). If yes, the program goes to S123. If not, i.e., Fus is cleared, the program jumps to S126.

At S123, it is judged if timer start flag Ftr is cleared (Ftr←0). Flag Ftr is to be established (Ftr←1) when the threshold setting timer starts and is to be cleared (Ftr←0) when the threshold setting timer stops.

If yes at S123, i.e., flag Ftr is cleared (Ftr←0), the program goes to S124 where the threshold setting timer starts and timer start flag Ftr is established (Ftr←1), and then goes to S125.

At S125, second threshold εΔS is employed as judgement threshold εΔ, and then the program goes to S126. εΔS is a positive value determined by experiments or calculation and is larger than εΔγ.

If not at S123, i.e., flag Ftr is established (Ftr←1) and the threshold setting timer is counting time, the program jumps to S126.

At 126, it is judged if absolute value of yaw rate deflection Δγ is larger than judgement threshold εΔ, i.e., turning characteristics is to be corrected. If yes, the program goes to S127 where the brake controller 40 sends signals to the brake actuator 25 and establishes braking control flag Fvs (Fvs←1).

When the program comes to S126 passing through S113 and S120, the brake actuator 25 applies brake pressure BRL(=BFr) to the wheel cylinder 28*rl*.

When the program comes to S126 passing through S117 and S120, the brake actuator 25 applies brake pressure BRR(=BFr) to the wheel cylinder 28*rr*.

When the program comes to S126 passing through S114 and S121, the brake actuator 25 applies brake pressure BFR(=BFf) to the wheel cylinder 28*fr*.

When the program comes to S126 passing through S118 and S121, the brake actuator 25 applies brake pressure BFL(=BFf) to the wheel cylinder 28*fl*.

If not at S126, the program goes to S128.

At S122, straight or constant flag Fns, showing that the vehicle is in straight running or in neutral steering condition, is established (Fns←1) and then the program goes to S128.

At S128, braking control signals are not sent, braking control flag Fvs is cleared (Fvs←0) and brake fluid pressure is cleared. Then the program goes to S129.

At S129, it is judged if timer start flag Ftr is established, i.e., if the threshold setting timer is counting time.

If not, the program goes to S135 where straight or constant flag Fns is cleared and then goes out. If yes, the program goes to S130 where it is judged if a certain time has passed.

If yes at S130, the program goes to S132 where under steering pass flag Fus is cleared, then goes to S133 where first threshold εΔM is employed as judgement threshold εΔ, first threshold εΔM being a positive and larger than second threshold εΔS and determined by experiments or calculation, then goes to S134 where the threshold setting timer stops and timer start flag Ftr is cleared, then goes to S135 where straight or constant flag Fns is cleared, and then goes out.

If not at S130, i.e., a certain time has not passed, the program goes to S131 where it is judged if straight or constant flag Fns is established (Fns←1).

If not at S131, the program goes out. If yes at S131, the program goes to S132 where under steering pass flag Fus is cleared, then goes to S133 where first threshold εΔM is employed as judgement threshold εΔ, then goes to S134 where the threshold setting timer stops and timer start flag Ftr is cleared, then goes to S135 where straight or constant flag Fns is cleared, and then goes out.

Thus, even when it is before the threshold timer starts, first threshold εΔM is employed as judgement threshold εΔ in the case that vehicle becomes in straight or constant running condition.

The brake controller 40 sends a signal, showing that braking control flag Fvs is established, to the torque distribution controller 70.

Figure 3:
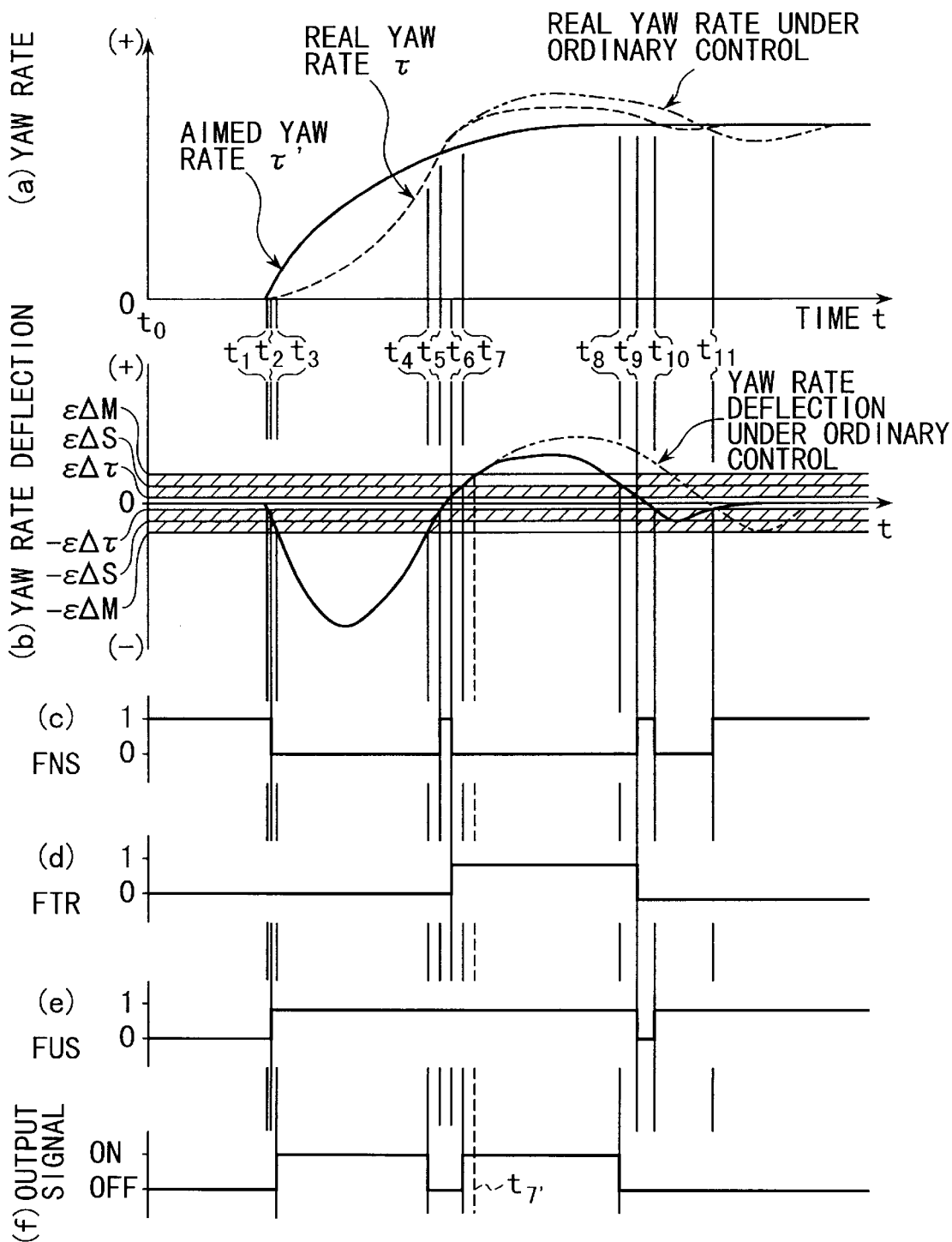
FIG. 3 is a time chart showing an example of braking force control according to the $1^{st}$ embodiment of the present invention.

FIG. 3 shows an example of the controls by the brake controller 40 especially for threshold value. In FIG. 3, the vehicle is running straight at t0 and starts left turning at t1. FIG. 3(*a*) shows aimed yaw rate Δ' and variations of real yaw rate γ. FIG. 3(*b*) shows variation of yaw rate deflection Δγ. FIG. 3(*c*) shows setting of straight or constant flag Fns. FIG. 3(*d*) shows setting of timer start flag Ftr. FIG. 3 (4)shows setting of under steering pass flag Fus. FIG. 3(*f*) shows ON-OFF of braking signal. Here, explanation will be done only for braking controls supposing that no influence is caused by other controls.

After t1, aimed yaw rate γ' is increasing. Though real yaw rate γ follows aimed yaw rate γ' but difference of γ and γ' is becoming larger. Namely absolute value |Δγ| of yaw rate deflection Δγ is getting larger in negative domain. [0087]

At t2, absolute value |Δγ| of yaw rate deflection Δγ becomes larger than absolute value |εΔγ|, εΔγ being used as threshold value for judgement of neutral steering. Then it is judged as under steering, under steering pass flag Fus is established, and straight or constant flag Fns is cleared. Because first threshold εΔM is, however, employed as judgement threshold εΔ, braking signal does not turn ON until t3 when absolute value |Δγ| of yaw rate deflection Δγ exceeds the judgement threshold εΔ.

After t3, braking signal remains ON until t4 when absolute value |Δγ| of yaw rate deflection Δγ becomes smaller than the judgement threshold εΔ again. This signal is in the case of γ>ε (sign is positive, left turn) and Δγ<-εΔγ(sign is negative, under steering), i.e., case 1 in FIG. 2. In case 1, braking force is applied to the rear left wheel 4*rl* and corrective moment in the arrow direction is applied to expel drift-out. Even when the real left wheel 4*rl* is locked due to too much braking force, additional yaw rate in the arrow direction as shown in FIG. 2 case 1 occurs.

As time passes, real yaw rate γ is catching up aimed yaw rate γ'. During the time from t4 to t5, though turning characteristics show still under steeling, braking control signal is not outputted because absolute value |Δγ| of yaw rate deflection Δ γ is smaller than the judgement threshold εΔ. During the time from t5 to t6, as absolute value |Δγ| of yaw rate deflection Δy is smaller than the threshold εΔγ, i.e., nearly neutral steering, straight or constant flag Fns is established.

Then yaw rate deflection Δγ becomes positive and is getting larger. After t6, i.e., over steering is noticed, straight or constant flag Fns is cleared, timer start flag Ftr is established, the threshold setting timer starts, and second threshold εΔS which is smaller than first threshold εΔM is employed as judgement threshold εΔ.

Till t7, because absolute value |Δγ| of yaw rate deflection Δγ is smaller than absolute value |εΔ| of judgement threshold εΔ, braking control signal is not outputted. After T7 braking control signal is outputted. This signal is in the case of γ>ε (sign is positive, left turn) and Δγ>εΔγ(sign is positive, over steering), i.e., case 2 in FIG. 2. In case 2, braking force is applied to the front right wheel 4fr and corrective moment in the arrow direction is applied to expel spinning. Even when the front right wheel 4fr is locked due to too much braking force, additional yaw rate in the arrow direction as shown in FIG. 2 case 2 occurs.

And from t8, absolute value |Δγ| of yaw rate deflection Δγ is smaller than judgement threshold εΔ resulting in getting into non control domain. At t9 neutral steering is noticed before the threshold setting timer counts up.

Therefore, straight or constant flag Fns is established, under steering pass flag Fus is cleared, the threshold setting timer stops, and timer start flag Ftr is cleared at t9. First threshold εΔM is employed as judgement threshold εΔ.

After then, during the time from t10 to t11, as absolute value |Δγ| of yaw rate deflection Δγ is larger than the threshold εΔγ, straight or constant flag Fns is cleared and under steering pass flag Fus is established at t10.

At t11, absolute value |Δγ| of yaw rate deflection Δγ becomes smaller than the threshold εΔ, i.e., nearly neutral steering and straight or constant flag Fns is established. Although under steering pass flag Fus remains established, it does not create any problem because most vehicles passed under steering condition before they show over steering in general.

After t8 and on, braking control signal is not outputted because absolute value |Δγ of yaw rate deflection Δγ is smaller than judgement threshold εΔ.

Because the brake controller 40 employs second threshold εΔS, whose absolute value is smaller than first threshold εΔM, as judgement threshold εΔ from when over steering is noticed until when controls against over steering is over even though predetermined time is not passed, corrective control against over steering preceded by under steering starts earlier. (Double dashed line in FIG. 3 shows another real yaw rate under ordinary control without this concept. In this case, control starting point is t7'.) Thus, difference of real yaw rate γ and aimed yaw rate γ' does not grow after turning characteristics change into over steering and real yaw rate γ can catch up aimed taw rate γ' earlier so that control can be done smoothly without giving the driver feeling of something wrong. When corrective controls against under steering and over steering are carried out successively, braking control to real wheel is depressed because non control domain is set wide in corrective control (against over steering) for under steering but narrow (against under steering) for over steering. Coming back of first threshold εΔM as judgement threshold εΔ from second threshold εΔS is done securely by the timer and by detecting termination of corrective control (against under steering) for over steering. And braking force to be applied to rear wheel is also depressed so that the driver may not feel uneasiness due to unexpectedly strong turning moment and rear wheel drifting can be avoided on slippery (low friction) road due to strong braking. Real yaw rate γ and yaw rate deflection Δγ are used for judgement of turning characteristics, i.e., under or over steering against aimed yaw rate γ', and are used for selection of wheel so that drifting out and spinning are securely prevented. Even when counter steering is carried out, braking force application to a wheel helping spinning can be avoided.

A transmission control unit 50, which carries out shift control, lock-up control, line pressure control and so on for the automatic transmission, sends information of gear ratio i to the torque distribution controller 70.

An engine control unit 60, which carries out fuel injection control, ignition timing control, air fuel ratio control, charged pressure control, throttle control and so on for the engine 1, sends information of throttle opening θth to the torque distribution controller 70.

The torque distribution controller 70 controls distribution of driving torque to front and rear from the ratio of front 35/rear 65 to a ratio, for example, front 50/rear 50 by controlling engaging pressure of the hydraulic multi-plate clutch (transfer clutch) 21 based on respective wheel speeds ω1, ω2, ω3 and ω4, inputted from the wheel seed sensors 29fl, 29fr, 29rl and 29rr, braking control flag Fvs status inputted from the brake controller 40, gear ratio i from the transmission control unit 50, and throttle opening angle θ th inputted from the engine control unit 60.

To be specific, when the brake controller 40 applies braking force to a certain wheel, weak force CTF1 (predetermined by experiments or calculations) is employed as engaging force of the hydraulic multi-plate clutch (transfer clutch) 21.

Figure 4:
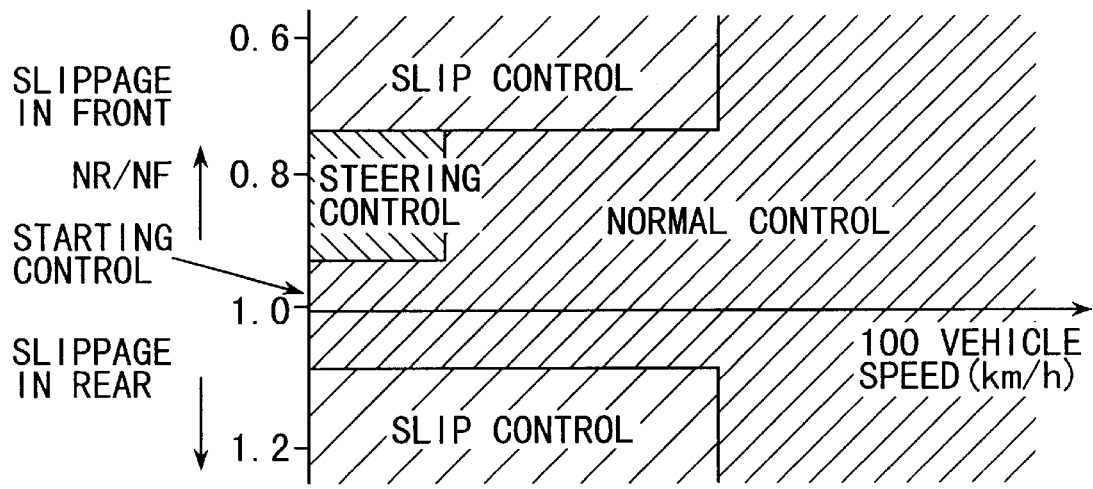
FIG. 4 is an illustration showing differential control according to the $1^{st}$ embodiment of the present invention.
Figure 5:
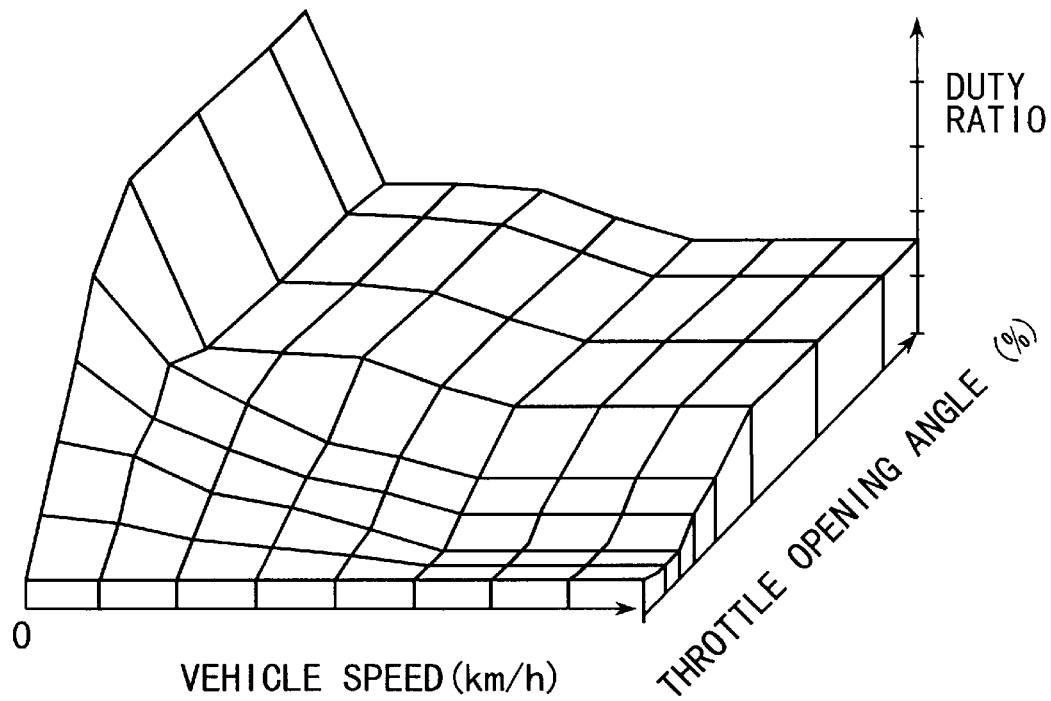
FIG. 5 is an illustration showing an example of differential torque control characteristics according to the $1^{st}$ embodiment of the present invention.

When the brake controller 40 applies no braking force to any wheel, differential limiting torque by the hydraulic multi-plate clutch (transfer clutch) 21 is controlled by referring to duty ratio map data according to running conditions, the map data being predetermined on the table map according to variables of throttle opening angle θth and vehicle speed V as shown in FIG. 5. In this case (no braking control by the braking controller 70), the torque distribution control is carried out in normal control, starting control, steering control and slip control as shown in FIG. 4.

The normal control has 5 maps, each of 5 is for $1^{st}$ gear, $2^{nd}$ gear, $3^{rd}$ gear, $4^{th}$ gear and reverse gear. The smaller the throttle opening is and the higher the speed is, the lower the differential limiting torque is set. Thus envisaged are up-grading turning characteristics and improvement of fuel economy.

In the starting control, differential limiting torque is controlled in proportion to throttle opening angle θth when it is judged that vehicle speed is 0 and vehicle is in straight posture in order to secure easy and smooth starting performance on slippery road.

In the steering control, differential limiting torque is controlled to be lowered according to front and rear rotational ratio NR/NF (NR: rotation number of rear wheel, NF: rotation number of front wheel) in a predetermined speed range in order to improve steering feeling in low speed range.

In the slip control, differential limiting torque is controlled in larger value than the normal control when rear wheel or front wheel slips beyond predetermined value in order to secure the maximum driving force and to improve running stability.

Figure 8:
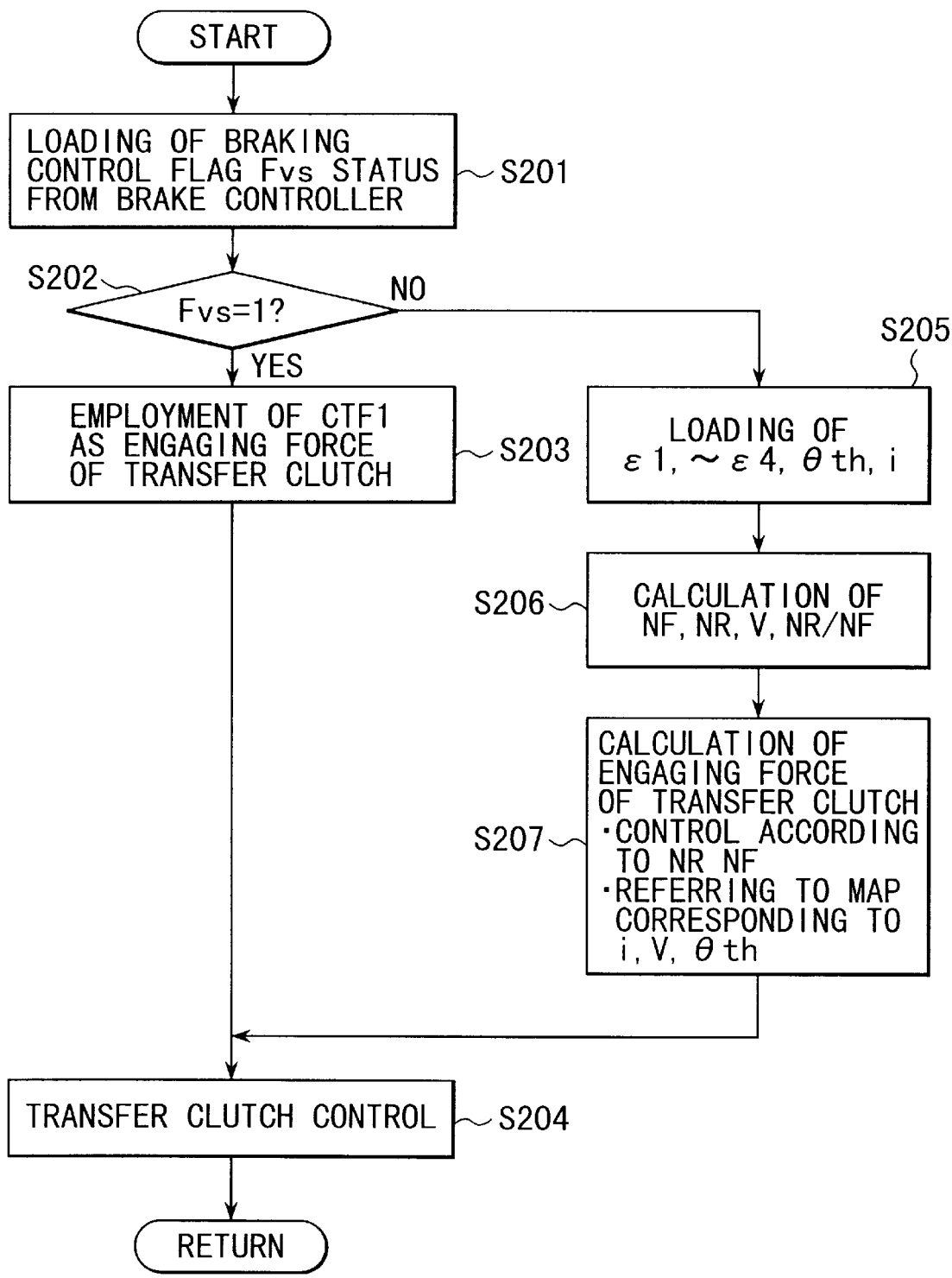
FIG. 8 is a flow chart of torque distribution control according to the $1^{st}$ embodiment of the present invention.

Controls by the torque distribution controller 70 are explained referring to flow chart shown in FIG. 8. This program is carried out in a predetermined interval. Firstly, status of braking control flag Fvs is inputted at S201, then the program goes to S202 where it is judged if braking control flag Fvs is established (Fvs←1).

If yes at S202, i.e., the case the brake controller 40 applies braking force to a certain wheel, the program goes to S203 where weak force CTF1 is employed as engaging force of the hydraulic multi-plate clutch (transfer clutch) 21, and then goes to S204 where the hydraulic multi-plate clutch (transfer clutch) 21 is controlled.

If not at S202, i.e. the case the brake controller 40 applies no braking force to any wheel and Fvs is cleared (Fvs←0), the program goes to S205 where wheel speeds ω1, ω2, ω3 and ω4 are inputted from the wheel speed sensors 29fl, 29fr, 29rl and 29rr respectively and gear ratio i and throttle opening angle θth are inputted from the transmission control unit 50 and the engine control unit 60 respectively. Then the program goes to S206.

At S206, number of rear wheel rotations NR, number of front wheel rotation NF, ratio of front and rear wheel rotations NR/NF and vehicle speed V are calculated from wheel speeds ω1, ω2, ω3 and ω4. Then the program goes to S207 where engaging force of the hydraulic multi-plate clutch (transfer clutch) 21 is calculated by referring to a table map corresponding gear ratio i according to throttle opening θth and vehicle speed V in a control mode selected from the four, i.e., the normal control, the starting control, the steering control and the slip control, according to ratio of front and rear rotations NR/NF and vehicle speed V. And then the program goes to S204 where the hydraulic multi-plate clutch (transfer clutch) 21 is controlled.

Namely, according to the first embodiment of the present invention, predetermined weak value CFT1 is employed as engaging force of the multi-plate clutch 21 so that each wheel can rotate freely when the brake controller 40 applies braking force to a certain wheel. Thus braking control by the brake controller 40 is ensured to be carried out as aimed and improve running stability of the vehicle at cornering.

Figure 9:
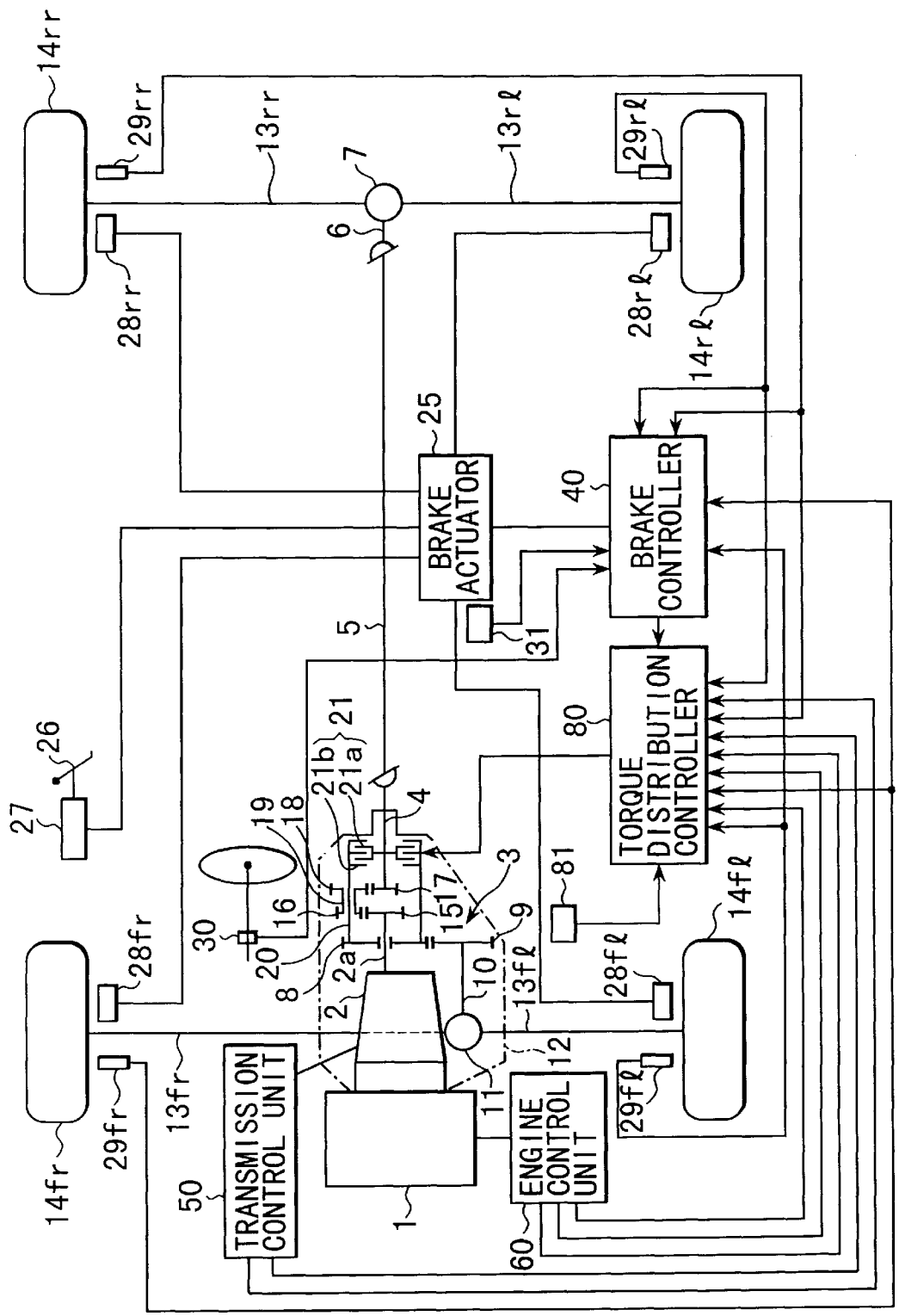
FIG. 9 is an illustration showing vehicle movements by the braking force control according to the $2^{nd}$ embodiment of the present invention.
Figure 10:
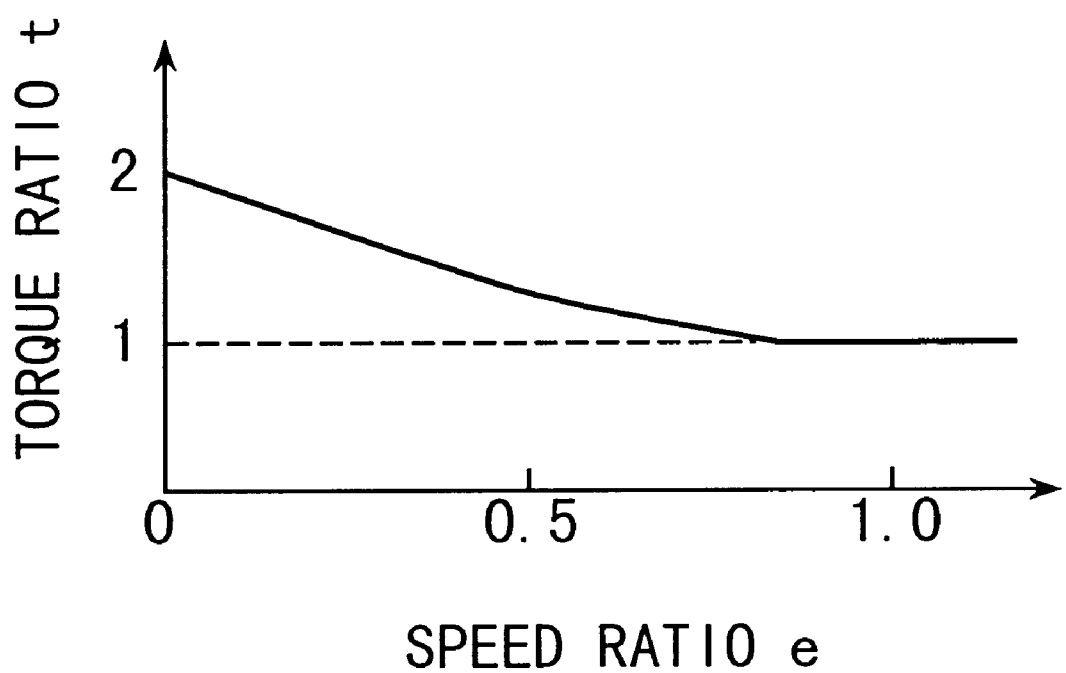
FIG. 10 is an illustration showing torque converter characteristic, i.e., torque ratio versus speed ratio.
Figure 11:
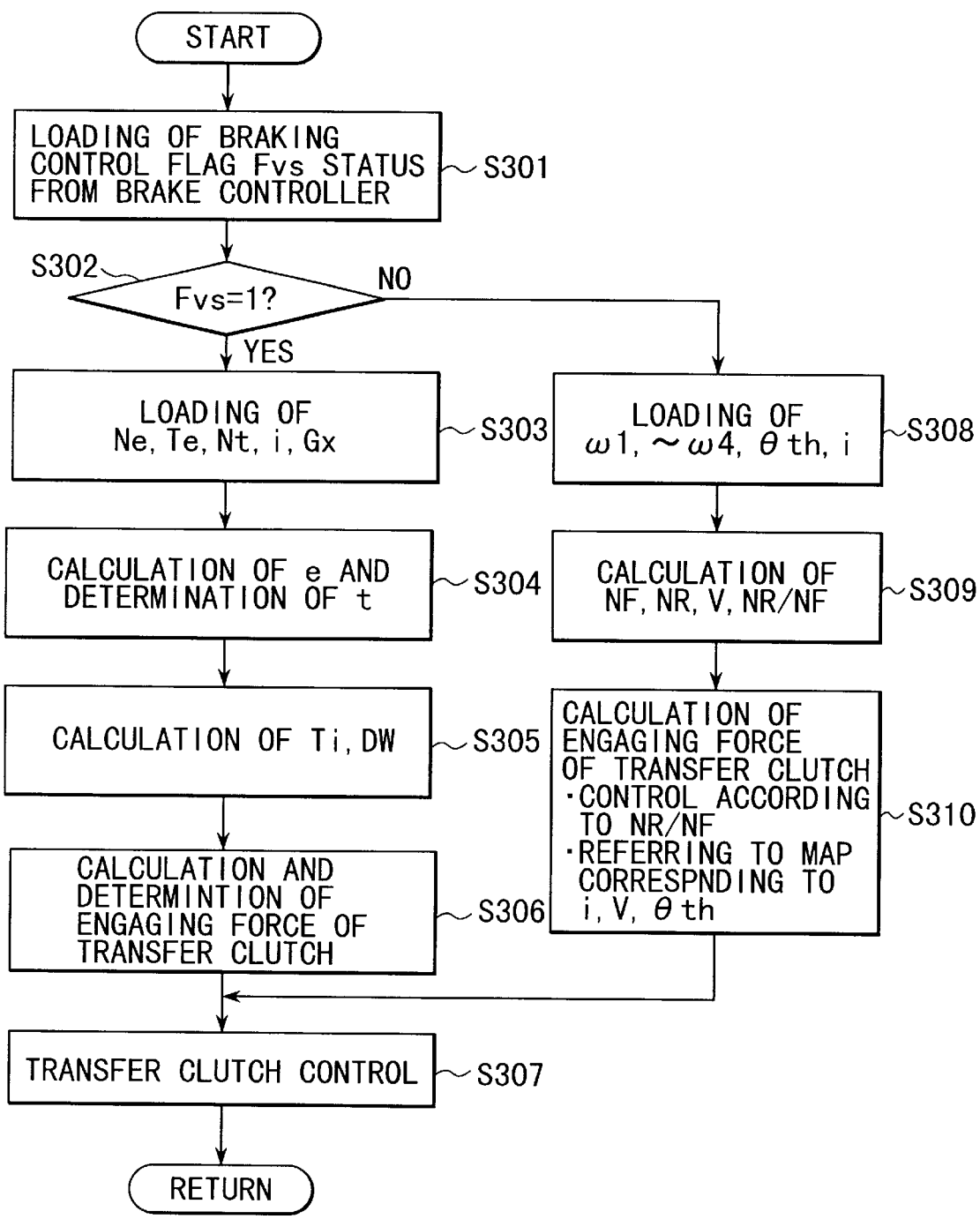
FIG. 11 is a flow chart of torque distribution control according to the $2^{nd}$ embodiment of the present invention.

The second embodiment of the present invention is shown in FIG. 9 through 11. FIG. 9 is an illustration showing an overall construction of a 4 wheel driven vehicle equipped with a torque distribution apparatus. FIG. 10 is an illustration showing torque converter characteristic, i.e., torque ratio t versus speed ratio e. FIG. 11 is a flow chart showing torque distribution control.

The torque distribution apparatus in the second embodiment of the present invention controls engaging torque of a hydraulic multi-plate clutch (transfer clutch) 21 so that torque distribution to front wheels and rear wheels is in line with vertical load distribution to front wheels and rear wheels. Vertical load distribution to front wheels and rear wheels is changed according to vehicle conditions, i.e., at standing still, in running with constant speed, at staring or at decelerating.

A longitudinal acceleration sensor 81 detecting longitudinal acceleration Gx is provided and Gx is inputted to a torque distribution controller 80. The torque controller 80 receives wheel speeds ω1, ω2, ω3 and ω4 from wheel speed sensors 29fl, 29fr, 29rl and 29rr respectively.

The torque distribution controller 80 receives braking control flag Fvs status from a brake controller 40, turbine speed Nt and gear ratio i from a transmission control unit 50, engine speed Ne, engine torque Te and throttle opening angle θth from an engine control unit 60. Engaging force of the hydraulic multi-plate clutch (transfer clutch) 21 is controlled based on these inputted data for torque distribution control.

Though the torque distribution controller 80 of the second embodiment of the present invention carries out torque distribution control as explained in the first embodiment when the brake controller 40 applies no braking force to any wheel, the controller 80 carries out control of torque distribution to front wheels and rear wheels with aimed distribution in line with vertical load distribution when the brake controller 40 applies braking force to a certain wheel.

Now operation of the torque distribution controller 80 is explained according to the flow chart shown in FIG. 11. The control program runs in every predetermined interval. At 301, status of braking control flag Fvs is inputted, and then the program goes to S302 where it is judged if braking control flag Fvs is established (Fvs←1).

If yes at S302, the program goes to S303 where inputted are engine speed Ne and engine torque Te from the engine control unit 60, turbine speed Nt and gear ratio i from the transmission control unit 50 and longitudinal acceleration Gx from the longitudinal acceleration sensor 81.

Then the program goes to S304 where torque converter speed ratio e (Nt/Ne) is calculated from engine speed Ne and turbine speed Nt and torque ratio t is determined.

Then the program goes to S305 where center differential input torque Ti and vertical load distribution Dw are calculated by formulas (16) and (17) respectively.

$$Ti = Te \cdot t \cdot i \quad (16)$$

$$Dw = (Mf - M \cdot Gx \cdot HI/WB)/(M \cdot g) \quad (17)$$

In the formulas, Mf is front wheel load at standing still, M is vehicle mass, HI is height of center of gravity, WB is wheel base and g is gravitational acceleration.

Then the program goes to S306 where engaging torque Tt of the hydraulic multi-plate clutch (transfer clutch) 21 is calculated in the following manner.

Torque distribution ratio Dt is expressed by the following formula;

$$Dt = (Ti \cdot Dt0 + Tt)/Ti$$

Dt0: Original distribution ratio
Tt: Engaging torque of the hydraulic multi-plate clutch (transfer clutch) 21

Therefore, Tt is calculated by the following formula;

$$Tt = (Dt - Dt0) \cdot Ti \quad (18)$$

Tt to be calculated at S306 is obtained by replacing Dt with Dw in formula (18).

Then the program goes to S307 where the hydraulic multi-plate clutch (transfer clutch) is controlled.

If not at S302, i.e., the case the brake controller 40 applies no braking force to any wheel and braking control flag Fvs is cleared (←0), the program goes to S308 where inputted are wheel speeds ω1, ω2, ω3 and ω4 from the wheel speed sensors 29fl, 29fr, 29rl and 29rr, gear ratio i from the transmission control unit 50 and throttle opening angle θth from the engine control unit 60.

Then the program goes to S309 where number of rear wheel rotations NR, number of front wheel rotation NF, ratio of front and rear rotations NR/NF and vehicle speed V are calculated from wheel speeds ω1, ω2, ω3 and ω4. Then the program goes to S310 where engaging force of the hydraulic multi-plate clutch (transfer clutch) 21 is calculated by referring to a table map corresponding gear ratio i according to throttle opening θth and vehicle speed V in a control mode selected from four control modes, i.e., normal control, starting control, steering control and slip control, according to ratio of front and rear wheel rotations NR/NF and vehicle speed V. And then the program goes to S307 where the hydraulic multi-plate clutch (transfer clutch) 21 is controlled.

According to the second embodiment of the present invention, torque distribution to front wheels and rear wheels is controlled with aimed distribution in line with vertical load distribution when the brake controller 40 applies braking force to a certain wheel. Thus, as differential control is determined at minimum and necessary value to keep enough traction performance and driving stability as 4 wheel driven vehicle, braking control by the brake controller 40 is carried out effectively while keeping performance of 4 wheel drive.

Figure 12:
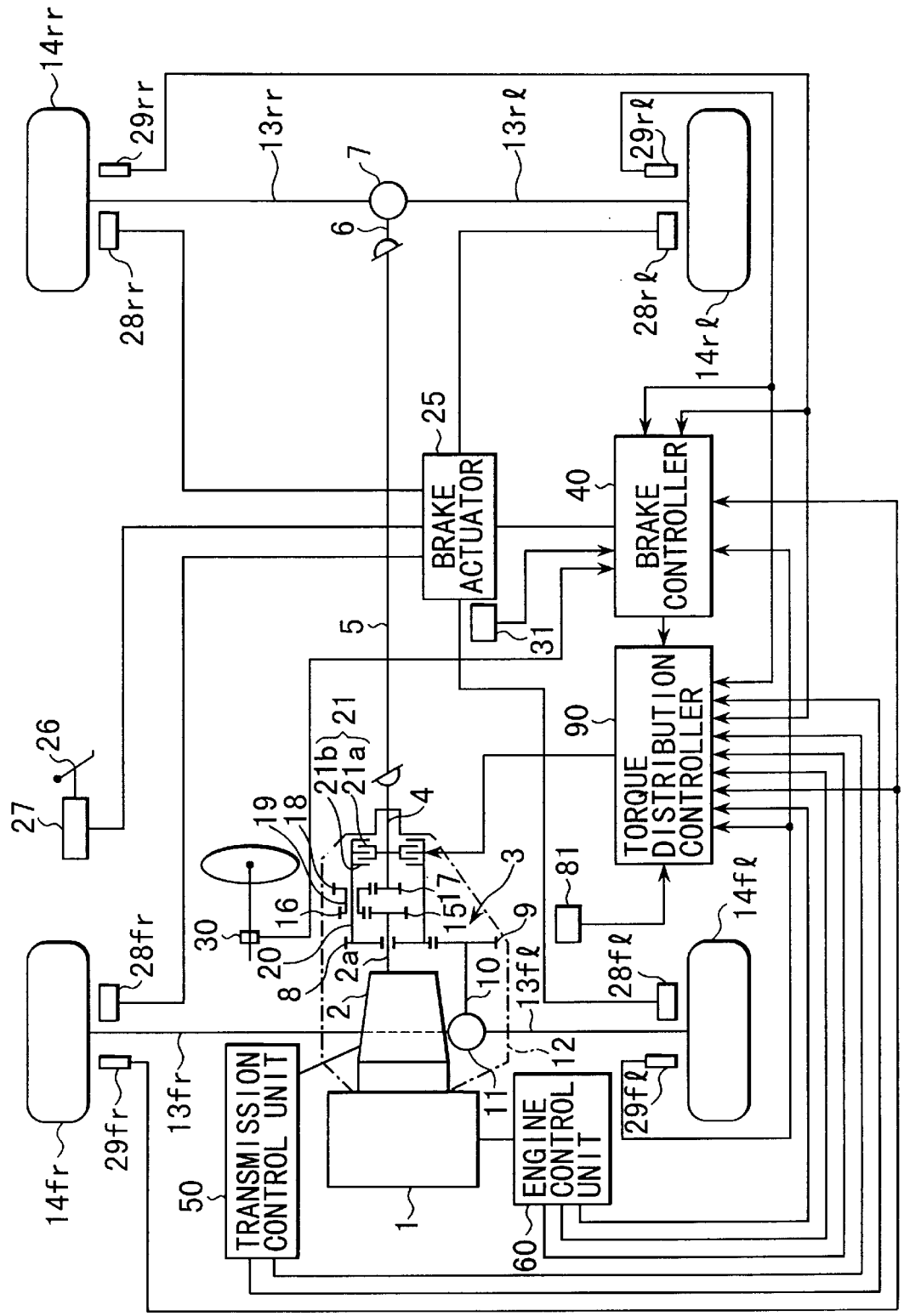
FIG. 12 is an illustration showing vehicle movements by the braking force control according to the $3^{rd}$ embodiment of the present invention.
Figure 13:
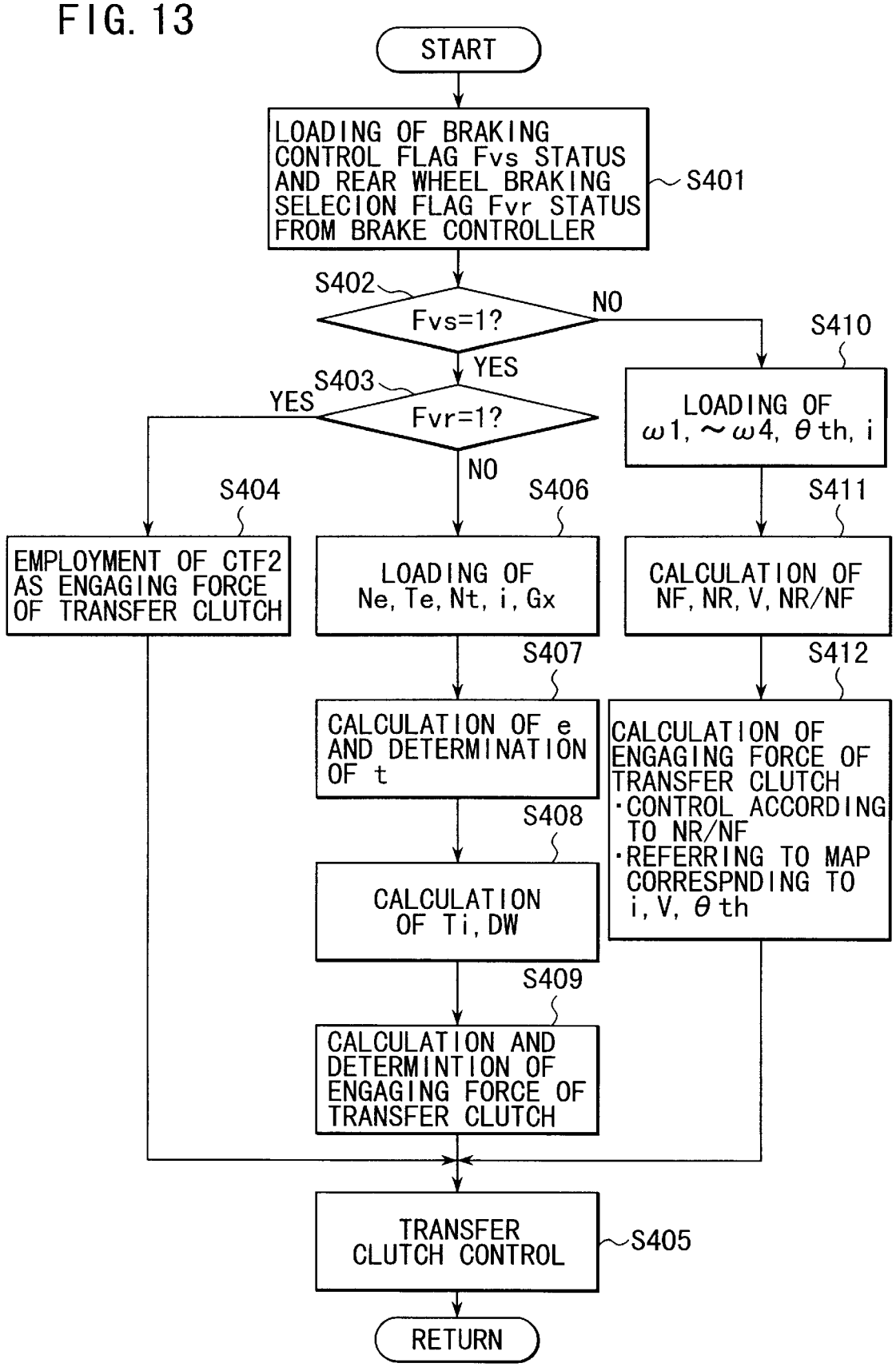
FIG. 13 is a flow chart of torque distribution control according to the $3^{rd}$ embodiment of the present invention.

The third embodiment of the present invention is shown in FIG. 12 and FIG. 13. FIG. 12 is an illustration showing an overall construction of a 4 wheel driven vehicle equipped with a torque distribution apparatus. FIG. 13 is a flow chart showing torque distribution control. In the third embodiment, standard torque distribution of a vehicle is so rear heavy that driving characteristics are similar to those of a front-engine-rear-wheel-driven vehicle when a hydraulic multi-plate clutch (transfer clutch) is released.

A torque distribution apparatus in the third embodiment of the present invention controls engaging force of the hydraulic multi-plate clutch (transfer clutch) at a predetermined value toward rear heavy torque distribution when the braking force controlling means works to make turning characteristics favorable to turn. On the other hand, when the braking force controlling means works to make it unfavorable to turn, the torque distribution apparatus controls engaging force of the hydraulic multi-plate clutch (transfer clutch) in the same manner as the second embodiment.

A torque distribution controller 90 receives longitudinal acceleration Gx from a longitudinal acceleration sensor 81 and wheel speeds ω1, ω2, ω3 and ω4 from wheel speed sensors 29fl, 29fr, 29rl and 29rr respectively in the same manner as the second embodiment of the present invention.

The torque distribution controller 90 receives braking control flag Fvs status and rear wheel braking selection flag Frv status from a brake controller 40, turbine speed Nt and gear ratio i from a transmission control unit 50, engine speed Ne, engine torque Te and throttle opening angle θth from an engine control unit 60. Engaging force of the hydraulic multi-plate clutch (transfer clutch) 21 is controlled based on these inputted data for torque distribution control.

Now operation of the torque distribution controller 90 is explained according to the flow chart shown in FIG. 13. The control program runs in every predetermined interval. At 401, statuses of braking control flag Fvs and rear wheel braking selection flag Fvr are inputted, and then the program goes to S402 where it is judged if braking control flag Fvs is established (Fvs←1).

If yes at S402, i.e., the case the brake controller 40 applies braking force to a certain wheel, the program goes to S403 where it is judged if rear wheel braking selection flag Fvr is established (Fvr←1).

If yes at S403, i.e., the case the brake controller 40 works to change turning characteristics to those favorable to turn against under steering, the program goes to S404 where predetermined weak force CTF2 is employed as engaging force of the hydraulic multi-plate clutch (transfer clutch) 21 for rear heavy distribution. And then the program goes to S405 where control of the hydraulic multi-plate clutch (transfer clutch) 21 is carried out.

If not at S403, i.e., the case the brake controller 40 works to change turning characteristics to those unfavorable to turn against over steering, the program goes to S406 where engine speed Ne, engine torque Te and throttle opening angle θth from the engine control unit 60, turbine speed Nt and gear ratio i from the transmission control unit 50 and longitudinal acceleration Gx from the longitudinal acceleration sensor 81 are inputted.

Then the program goes on to S407, S408 and S409 in order, which are corresponding to S304, S305 and S306 in the second embodiment of the present invention respectively. At S407, torque converter speed ratio e is calculated and torque ratio t is determined. At S408, center differential input torque Ti and vertical load distribution Dw are calculated by formulas (16) and (17) respectively. At S409, engaging torque Tt of the hydraulic multi-plate clutch (transfer clutch) 21 is calculated. And then the program goes to S405 where control of the hydraulic multi-plate clutch (transfer clutch) 21 is carried out.

If not at S402, i.e., the case the brake controller 40 applies no braking force to any wheel and braking control flag Fvs is cleared (←0), the program goes to S410 where inputted are wheel speeds ω1, ω2, ω3 and ω4 from the wheel speed sensors 29fl, 29fr, 29rl and 29rr, gear ratio i from the transmission control unit 50 and throttle opening angle θth from the engine control unit 60.

Then the program goes to 411 where number of rear wheel rotations NR, number of front wheel rotation NF, ratio of front and rear rotations NR/NF and vehicle speed V are calculated from wheel speeds (ω1, ω2, ω3 and ω4. Then the program goes to S412 where engaging force of the hydraulic multi-plate clutch (transfer clutch) 21 is calculated by referring to a table map corresponding gear ratio i according to throttle opening θ th and vehicle speed V in a control mode selected from four control modes, i.e., normal control, starting control, steering control and slip control, according to ratio of front and rear wheel rotations NR/NF and vehicle speed V. And then the program goes to S405 where the hydraulic multi-plate clutch (transfer clutch) 21 is controlled.

Reduction of engaging force of the hydraulic multi-plate clutch (transfer clutch) 21 during braking control results in increasing of rear wheel driving torque. The increasing of rear wheel driving torque results in lowering lateral gripping power, i.e., degrading of running stability because of having tendency to spin.

When braking control is about to be done for correcting strong over steering, reduction of engaging force of the hydraulic multi-plate clutch (transfer clutch) 21 is a contradictory operation. Reduction of engaging force of the hydraulic multi-plate clutch (transfer clutch) 21 is an operation toward over steeling in this case.

Because of the above, when braking control is carried out for changing turning characteristics to those favorable to turn, it is prohibited to reduce engaging force of the hydraulic multi-plate clutch (transfer clutch) 21.

On the other hand, when braking control is carried out for changing turning characteristics to those unfavorable to turn, engaging force of the hydraulic multi-plate clutch (transfer clutch) 21 is reduced.

Thus, according to the third embodiment of the present invention, the braking control can be done effectively to change turning characteristics.

Figure 14:
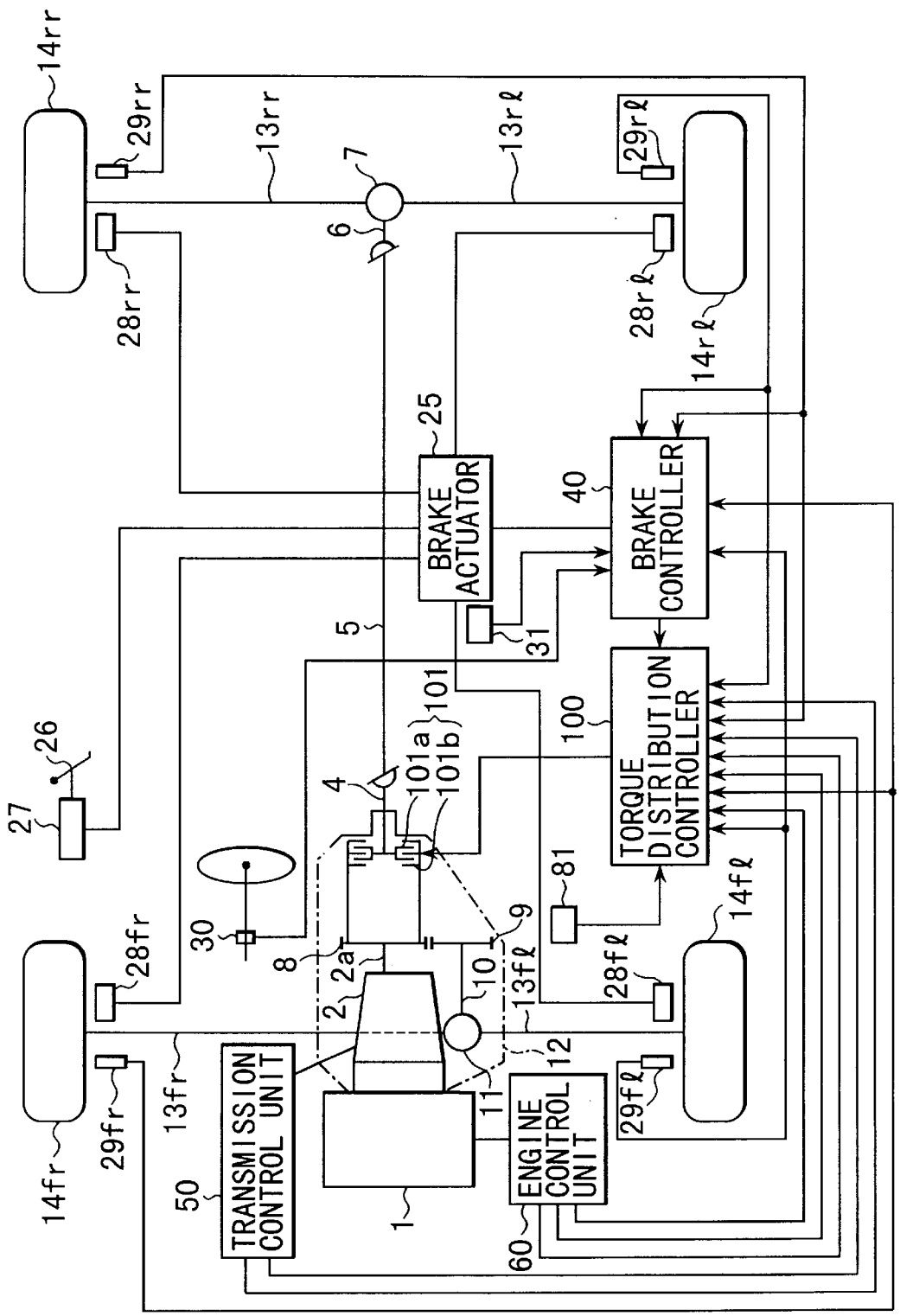
FIG. 14 is an illustration showing vehicle movements by the braking force control according to the $4^{th}$ embodiment of the present invention.
Figure 15:
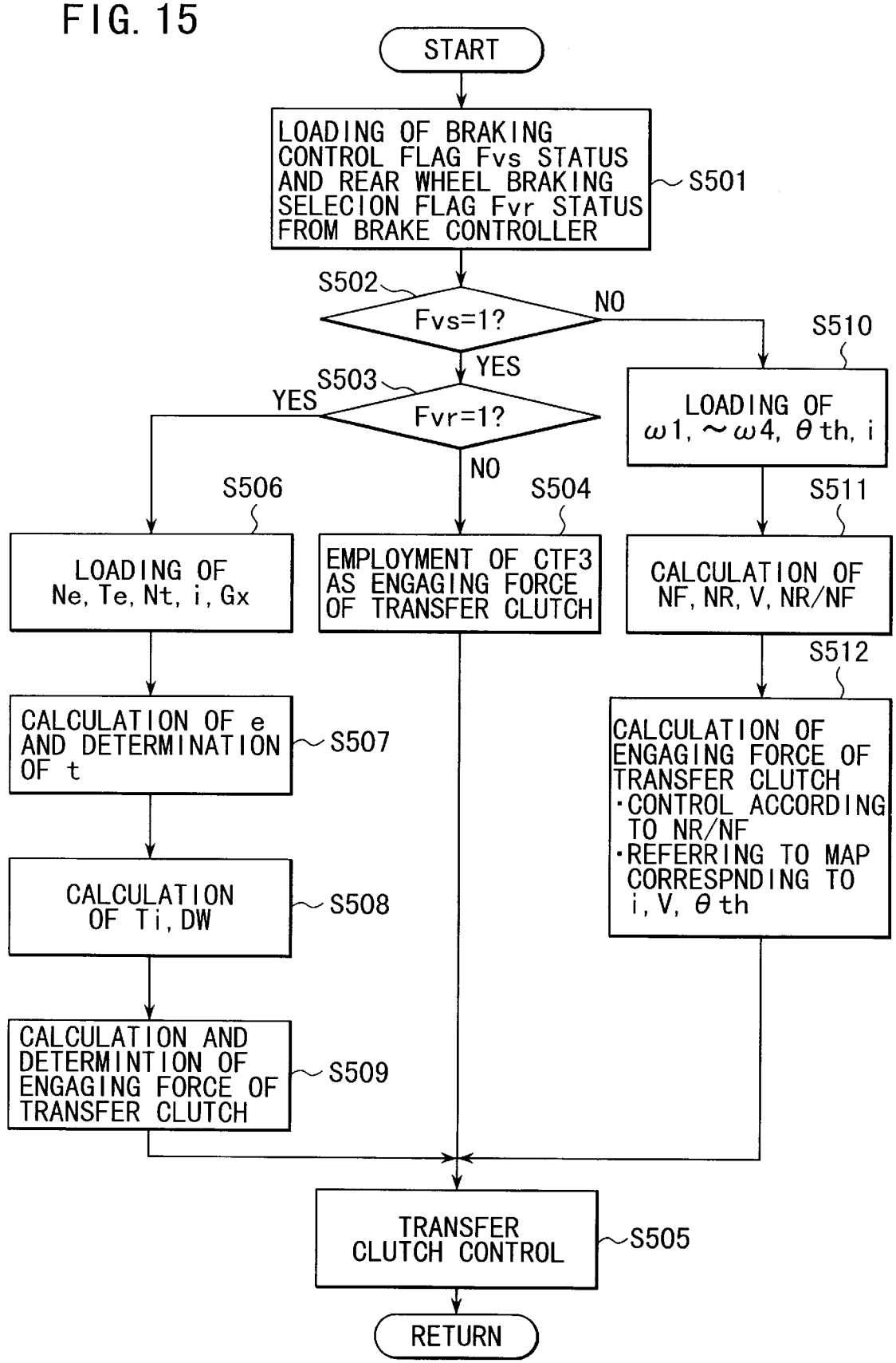
FIG. 15 is a flow chart of torque distribution control according to the $4^{th}$ embodiment of the present invention.

The fourth embodiment of the present invention is shown in FIG. 14 and FIG. 15. FIG. 14 is an illustration showing an overall construction of a 4 wheel driven vehicle equipped with a torque distribution apparatus. FIG. 15 is a flow chart showing torque distribution control. In the fourth embodiment, torque distribution to front wheels and rear wheels varies from 100:0 to 50:50 and driving characteristics of the vehicle are similar to those of a front wheel driven vehicle when a hydraulic multi-plate clutch (transfer clutch) is released.

A torque distribution apparatus in the fourth embodiment of the present invention controls engaging force of the hydraulic multi-plate clutch (transfer clutch) in same manner as that of the second embodiment of the present invention, when braking control is carried out to change turning characteristics to those favorable to turn. Thus braking control and differential control are kept effective. On the other hand, when braking control is carried out to change turning characteristics to those unfavorable to turn, engaging force of the hydraulic multi-plate clutch (transfer clutch) is set at a predetermined value to make torque distribution front heavy.

Referring to FIG. 14, a hydraulic multi-plate clutch (transfer clutch) 101 comprises a plurality of driven plate 101a connected to a rear drive shaft 4 and a plurality of drive plate 101b connected to a transfer drive gear 8, which are placed alternately. And a torque distribution controller 100 operates the hydraulic multi-plate clutch (transfer clutch) 101 by application of hydraulic pressure through hydraulic circuits (not shown) so that the clutch engagement is controlled to vary torque distribution to front and rear from 100:0 to 50:50.

The torque distribution apparatus 100 receives longitudinal acceleration Gx from a longitudinal acceleration sensor 81 and wheel speeds $\omega 1$, $\omega 2$, $\omega 3$ and $\omega 4$ from wheel speed sensors 29fl, 29fr, 29rl and 29rr respectively.

The torque distribution controller 100 receives braking control flag Fvs status and rear wheel braking selection flag Frv status from a brake controller 40, turbine speed Nt and gear ratio i from a transmission control unit 50, engine speed Ne, engine torque Te and throttle opening angle θth from an engine control unit 60. Engaging force of the hydraulic multi-plate clutch (transfer clutch) 101 is controlled based on these inputted data for torque distribution control.

Now operation of the torque distribution controller 100 is explained according to the flow chart shown in FIG. 15. The control program runs in every predetermined interval. At 501, statuses of braking control flag Fvs and rear wheel braking selection flag Fvr are inputted, and then the program goes to S502 where it is judged if braking control flag Fvs is established (Fvs←1).

If yes at S502, the program goes to S503 where it is judged if rear wheel braking selection flag Fvr is established (Fvr←1).

If yes at S503, i.e., the case the brake controller 40 works to change turning characteristics to those unfavorable to turn against over steering, the program goes to S504 where predetermined weak force CTF3 is employed as engaging force of the hydraulic multi-plate clutch (transfer clutch) 101 for front heavy distribution. And then the program goes to S505 where control of the hydraulic multi-plate clutch (transfer clutch) 101 is carried out.

If not at S503, i.e., the case the brake controller 40 works to change turning characteristics to those favorable to turn against under steering, the program goes to S506 where engine speed Ne and engine torque Te from the engine control unit 60, turbine speed Nt and gear ratio i from the transmission control unit 50 and longitudinal acceleration Gx from the longitudinal acceleration sensor 81 are inputted.

Then the program goes on to S507, S508 and S509 in order, which are corresponding to S304, S305 and S306 in the second embodiment of the present invention respectively. At S507, torque converter speed ratio e is calculated and torque ratio t is determined. At S508, center differential input torque Ti and vertical load distribution Dw are calculated by formulas (16) and (17) respectively. At S509, engaging torque Tt of the hydraulic multi-plate clutch (transfer clutch) 101 is calculated. And then the program goes to S505 where control of the hydraulic multi-plate clutch (transfer clutch) 101 is carried out.

If not at S502, i.e., the case the brake controller 40 applies no braking force to any wheel and braking control flag Fvs is cleared (←0), the program goes to S510 where inputted are wheel speeds ($\omega 1$, $\omega 2$, $\omega 3$ and $\omega 4$ from the wheel speed sensors 29fl, 29fr, 29rl and 29rr, gear ratio i from the transmission control unit 50 and throttle opening angle θth from the engine control unit 60.

Then the program goes to 511 where number of rear wheel rotations NR, number of front wheel rotation NF, ratio of front and rear wheel rotations NR/NF and vehicle speed V are calculated from wheel speeds $\omega 1$, $\omega 2$, $\omega 3$ and $\omega 4$. Then the program goes to S512 where engaging force of the hydraulic multi-plate clutch (transfer clutch) 101 is calculated by referring to a table map corresponding gear ratio i according to throttle opening θth and vehicle speed V in a control mode selected from four control modes, i.e., normal control, starting control, steering control and slip control, according to ratio of front and rear wheel rotations NR/NF and vehicle speed V. And then the program goes to S505 where the hydraulic multi-plate clutch (transfer clutch) 101 is controlled.

When braking control is about to be done for correcting under steering, reduction of engaging force of the hydraulic multi-plate clutch (transfer clutch) 101 is a contradictory operation. Reduction of engaging force of the hydraulic multi-plate clutch (transfer clutch) 101 is an operation toward under steeling in this case.

Because of the above, when braking control is carried out for changing turning characteristics to those favorable to turn, it is prohibited to reduce engaging force of the hydraulic multi-plate clutch (transfer clutch) 101.

On the other hand, when braking control is carried out for changing turning characteristics to those unfavorable to turn, engaging force of the hydraulic multi-plate clutch (transfer clutch) 21 is reduced.

Thus, according to the fourth embodiment of the present invention, the braking control can be done effectively to change turning characteristics.

The third embodiment of the present invention is also applicable to 4 wheel driven vehicle derived from rear wheel driven vehicle and having no center differential. The fourth embodiment of the present invention is also applicable to 4 wheel driven vehicle derived from front wheel driven vehicle and having no center differential.

Figure 16:
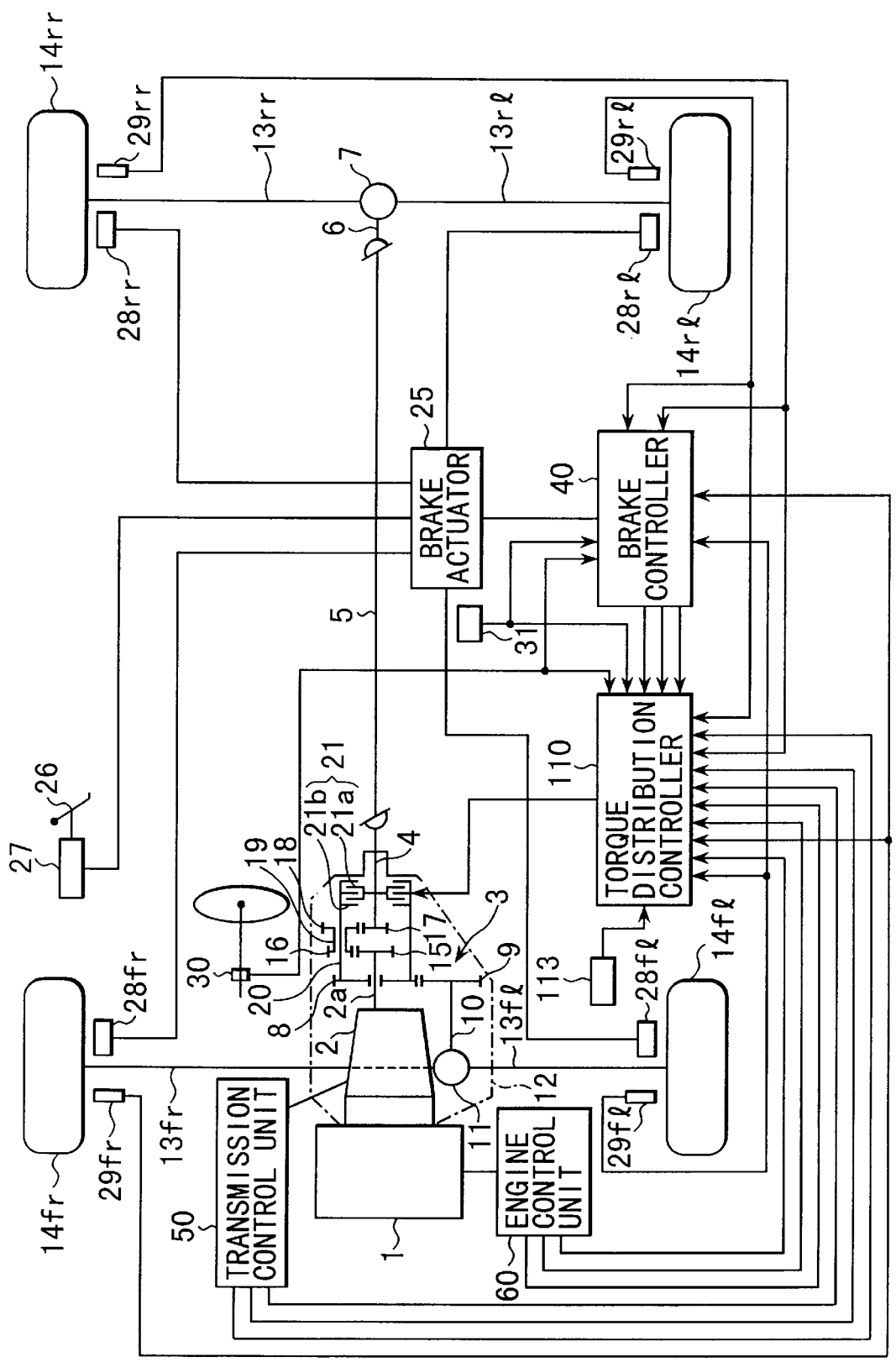
FIG. 16 is an illustration showing vehicle movements by the braking force control according to the $5^{th}$ embodiment of the present invention.
Figure 17:
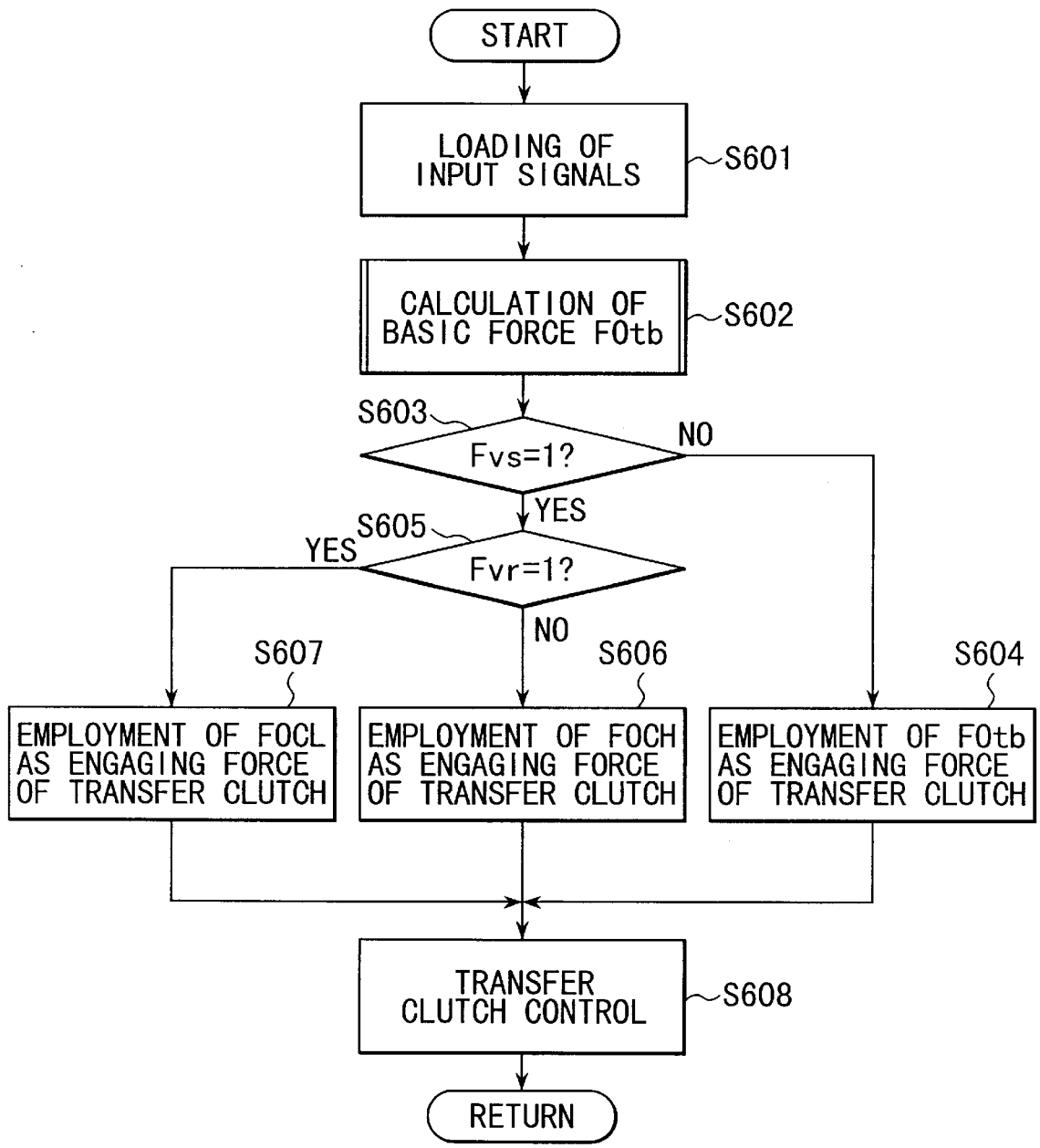
FIG. 17 is a flow chart of torque distribution control according to the $5^{th}$ embodiment of the present invention.

The fifth embodiment of the present invention is shown in FIG. 16 and FIG. 17. FIG. 16 is an illustration showing an overall construction of a 4 wheel driven vehicle equipped with a torque distribution apparatus. FIG. 17 is a flow chart showing torque distribution control. In the fifth embodiment, 4 wheel driven vehicle equipped with an automatic transmission is same type of vehicle referred to in the third embodiment of the present invention, i.e., torque distribution is rear heavy and running characteristics when a hydraulic multi-plate clutch (transfer clutch) is released are similar to those of front-engine-rear-wheel-driven vehicle.

A torque distribution apparatus in the fifth embodiment of the present invention controls engaging force of the hydraulic multi-plate clutch (transfer clutch) at a predetermined value toward rear heavy torque distribution when the braking force controlling means works to make turning characteristics favorable to turn. On the other hand, when the braking force controlling means works to make it unfavorable to turn, the torque distribution apparatus controls engaging force of the hydraulic multi-plate clutch (transfer clutch) at a predetermined value toward increasing front wheel torque distribution when the braking force controlling means works to make turning characteristics unfavorable to turn.

As shown in FIG. 16, A torque distribution controller 110 in the fifth embodiment of the present invention receives wheel speeds ω1, ω2, ω3 and ω4 from wheel speed sensors 29fl, 29fr, 29rl and 29rr respectively, steering wheel angle θ from a steering wheel angle sensor 30 and real yaw rate γ from a yaw rate sensor 31.

In addition to the above, status of braking control flag Fvs, status of rear wheel braking selection flag Fvr and calculated yaw rate deflection Δγ are inputted from a brake controller 40.

Turbine speed Nt, gear ratio i, gear position Lposi (especially parking P, neutral N and first speed 1) are inputted from a transmission control unit 50, and engine speed Ne, engine torque Te and throttle opening angle θth from an engine control unit 60.

Provided is a road friction estimator 113, estimating road surface friction coefficient μ by calculation, e.g., an estimating method disclosed by the inventor in the Japanese Patent Laid-open No. 2274/1996, based on steering wheel angle θ, yaw rate γ and vehicle speed V.

How to estimate is; firstly calculating actual cornering power of front and rear wheels of the vehicle based on steering wheel angle θ, yaw rate γ and vehicle speed V by solving equation of motion of vehicle-lateral movement; secondary calculating theoretically maximum cornering power on highμ; finally estimating road surface friction coefficient μ from ratio of the actual cornering power and the theoretically maximum cornering power.

The road friction estimator 113 sends road surface friction coefficient μ to the torque distribution controller 110.

The torque distribution controller 110 controls the hydraulic multi-plate clutch (transfer clutch) 21 by one of three engaging forces, i.e., basic force FOtb, predetermined weak force FOCL and predetermined strong force FOCH according to operation of the brake controller 40. Basic force Fotb, being calculated in a manner mentioned later, is for the case of no application of braking control. Predetermined weak force FOCL is for the case the brake controller works to change turning characteristics to those favorable to turn against under steering. Predetermined strong force FOCL is for the case the brake controller works to change turning characteristics to those unfavorable to turn against over steering.

Basic force FOtb is calculated as explained in the following.

Control clutch torque VTDout is calculated by adding basic clutch torque VTDout0 corresponding to road surface friction coefficient μ with steer-control corrective torque FA1 incrementally correcting according to center differential input torque Ti, tack-in-prevention corrective torque FA2 incrementally correcting corresponding to throttle opening angle θth and real yaw rate γ, yaw-rate-feed-back corrective torque VTDy incrementally or reductively correcting corresponding to yaw rate deflection Δγ, and lateral-acceleration corrective torque VDTg reductively correcting corresponding to estimated lateral deceleration.

Basic clutch torque VTDout0 is determined according to road surface friction coefficient μ referring to a map established by experiments or calculations or is calculated, in order to prevent radical drift out. The higher μ becomes the smaller VTDout0 is.

Steer-control corrective torque FA1 is determined, in order to prevent steering change, referring to map in which FA1 varies according to center differential input torque Ti. The larger center differential torque Ti is, the larger steer-control corrective torque FA1.

Tack-in-prevention corrective torque FA2 is determined, in order to prevent tack-in behavior at accelerator pedal off, referring to map in which FA2 varies according to real yaw rate γ, throttle opening angle θth and front wheel speed . The higher the front wheel speed becomes, the larger tack-in-prevention corrective torque FA2 is when throttle opening angle θth changes into 0 (zero) while real yaw rate γ and front wheel speed are more than specified values. Yaw-rate-feed-back corrective torque VTDy is determined, in order to prevent under steering or over steering, referring to a map in which VTDy varies according to yaw rate deflection Δγ. The larger yaw rate deflection Δγ becomes, the larger VTDy is.

Lateral-acceleration corrective torque VTDg is determined, in order to prevent under steering at critical turning, referring to a map in which VTDg varies according to lateral acceleration. The larger the lateral acceleration becomes, the smaller control clutch torque VTDout is. Control clutch torque VTDout is further corrected by steering wheel angle θ. When front wheel speed is low, e.g. less than 30 km/h, control clutch torque VTDout is reduced according to increment of steering wheel angle θ in order to prevent tight corner braking phenomenon. When steering wheel is at neutral and front wheel speed is high, e.g., more than 50 km/h, control clutch torque VTDout is reduced in order to improve fuel economy.

Thus clutch torque VTDout finally determined is employed as Basic force FOtb for engaging the hydraulic multi-plate clutch (transfer clutch).

Operation of the torque distribution controller 110 is explained according to the flow chart shown in FIG. 17. The control program runs in every predetermined interval. At 601, the torque distribution controller 110 receives wheel speeds ω1, ω2, ω3 and ω4, steering wheel angle θ, real yaw rate γ status of braking control flag Fvs, status of rear wheel braking selection flag Fvr, yaw rate deflection Δγ, turbine speed Nt, gear ratio i, gear position Lposi, engine speed Ne, engine torque Te, throttle opening angle θth, and road surface friction coefficient μ, and then the program goes to S602 where basic force FOtb is calculated.

Then the program goes to S603 where it is judged if braking control flag Fvs is established. If not, i.e., the brake controller 40 does not apply braking force to any wheel, the program goes to S604 where basic force FOtb is employed as engaging force of the hydraulic multi-plate clutch (transfer clutch) 21.

If yes at S603, i.e., the case the brake controller 40 applies braking force to a certain wheel, the program goes to S605 where it is judged if rear wheel braking selection flag Fvr is established (Fvrk←1).

If not at S605, i.e., the case the brake controller 40 works to change turning characteristics to those unfavorable to turn against over steering, the program goes to S606 where strong force FOCH is employed as engaging force of the hydraulic multi-plate clutch (transfer clutch) 21.

If yes at S605, i.e., the case the brake controller 40 works to change turning characteristics to those favorable to turn against under steering, the program goes to S607 where weak force FOCL is employed as engaging force of the hydraulic multi-plate clutch (transfer clutch) 21.

Then the program goes to S608 where the hydraulic multi-plate clutch (transfer clutch) 21 is controlled by engaging force employed at S604, S606 or S607. However, if gear position Lposi is P or N, engaging force of the hydraulic multi-plate clutch (transfer clutch) 21 is 0 (zero).

According to the fifth embodiment of the present invention, when the brake controller 40 works to change turning characteristics to those favorable to turn, engaging force of the hydraulic multi-plate clutch (transfer clutch) 21 is determined to weak force FOCL to increase distribution to rear wheels resulting in promoting the control to change turning characteristics to those favorable to turn. And when the brake controller 40 works to change turning characteristics to those unfavorable to turn, engaging force of the hydraulic multi-plate clutch (transfer clutch) 21 is determined to strong force FOCH toward firm coupling of the hydraulic multi-plate clutch (transfer clutch) 21 resulting in promoting running stability. Thus the braking control can be done effectively to change turning characteristics.

FOCL and FOCH, i.e., engaging force s of control for the hydraulic multi-plate clutch (transfer clutch) 21 when the brake controller works, are simple e and fixed value. Therefore, control scheme can be simplified and control response is good.

Figure 18:
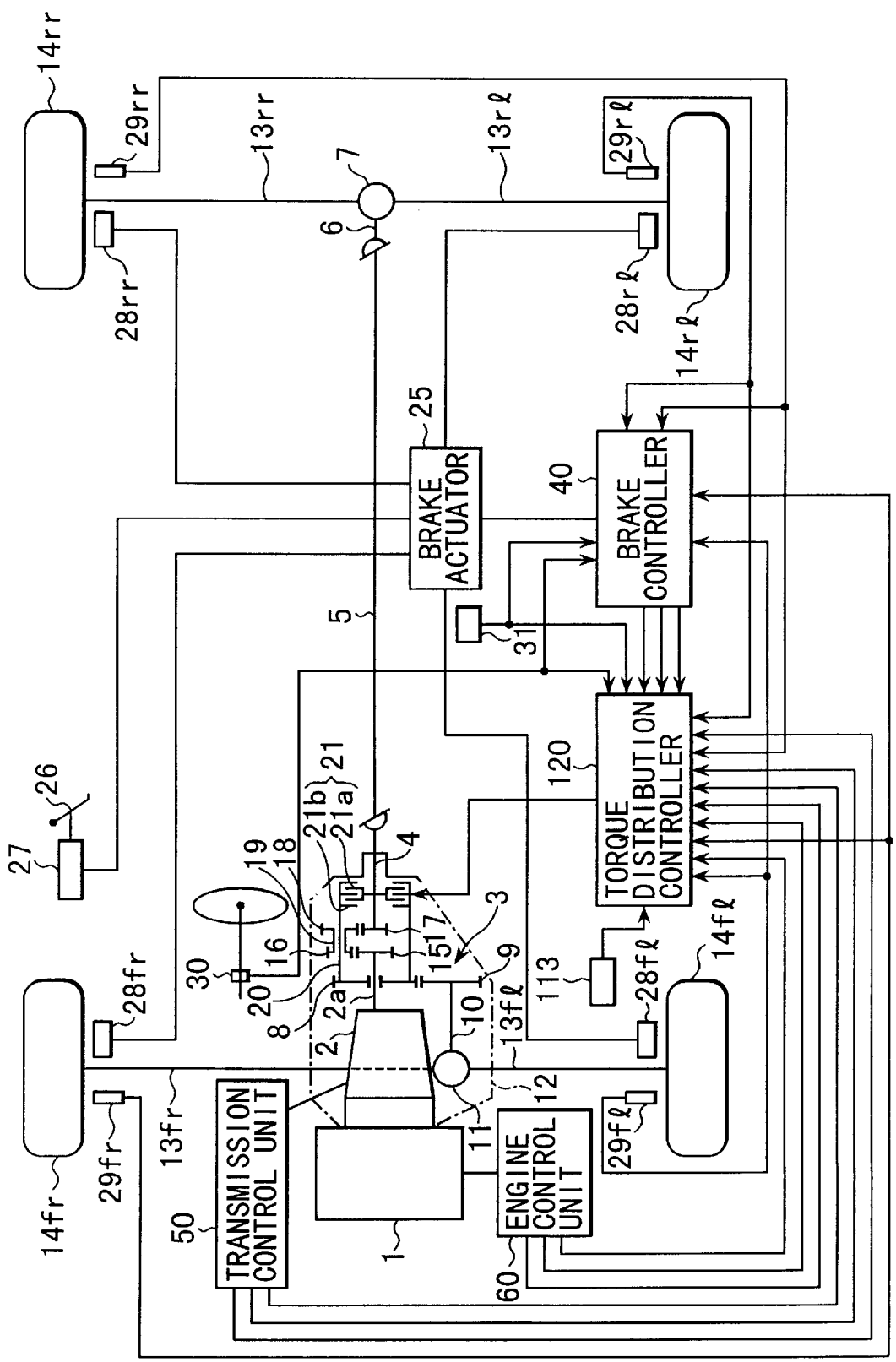
FIG. 18 is an illustration showing vehicle movements by the braking force control according to the $6^{th}$ embodiment of the present invention.
Figure 19:
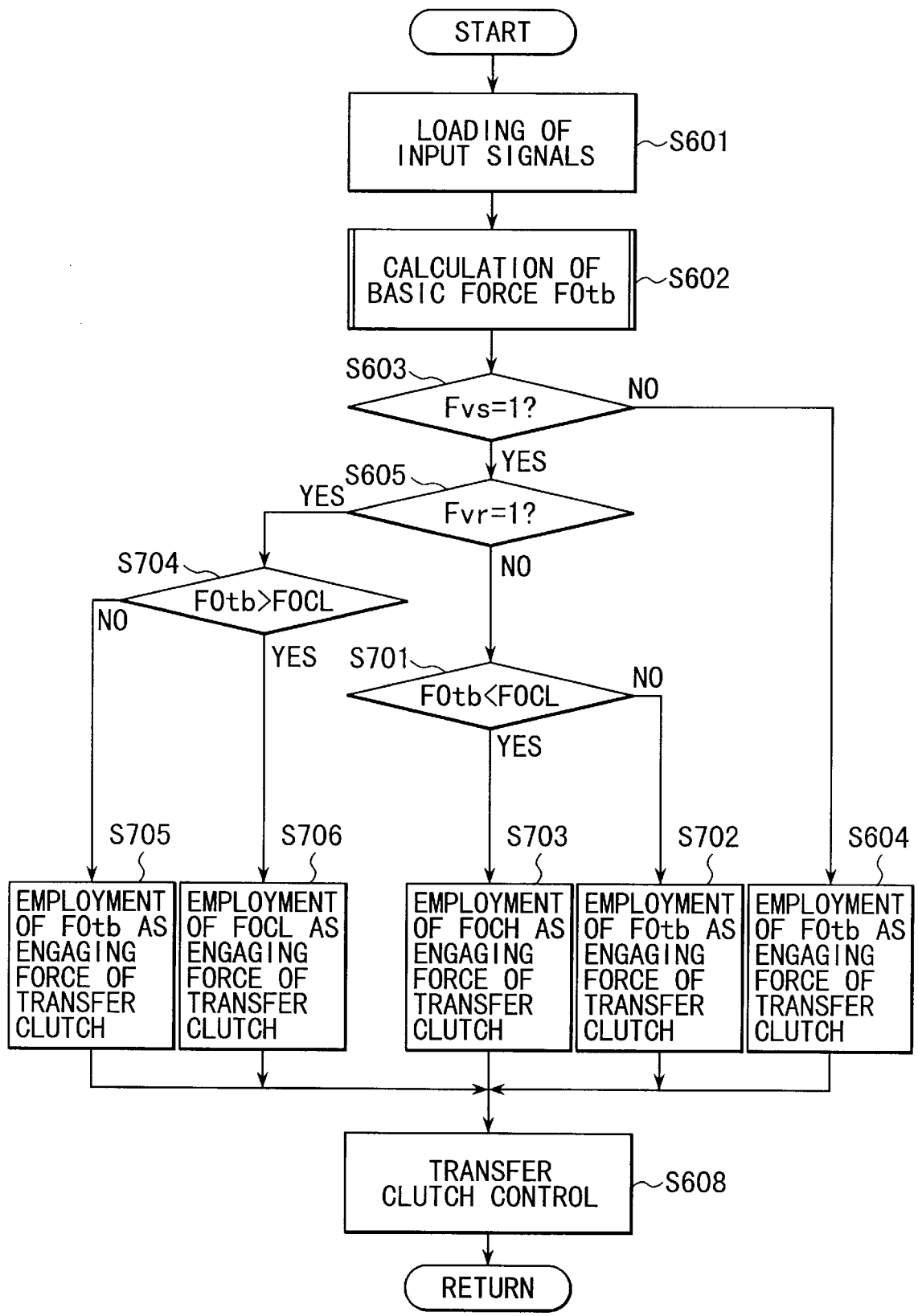
FIG. 19 is a flow chart of torque distribution control according to the $6^{th}$ embodiment of the present invention.

The sixth embodiment of the present invention is shown in FIG. 18 and FIG. 19. FIG. 18 is an illustration showing an overall construction of a 4 wheel driven vehicle equipped with a torque distribution apparatus. FIG. 19 is a flow chart showing torque distribution control. In the sixth embodiment, 4 wheel driven vehicle equipped with an automatic transmission is same as referred to in the fifth embodiment of the present invention. The torque distribution apparatus in the sixth embodiment of the present invention controls engaging force of a hydraulic multi-plate clutch (transfer clutch) with lower one of predetermined weak force FOCL and basic force FOtb toward rear heavy torque distribution when the braking force controlling means works to make turning characteristics favorable to turn. On the other hand, the torque distribution apparatus controls engaging force of the hydraulic multi-plate clutch (transfer clutch) with higher one of strong force FOCH or basic force FOtb toward increasing front wheel torque distribution when the braking force controlling means works to make turning characteristics unfavorable to turn.

Accordingly, a torque distribution controller 120 in the sixth embodiment of the present invention is similar to the torque distribution controller 110 in the fifth embodiment of the present invention as shown in FIG. 18, but control scheme is different.

Operation of the torque distribution controller 120 is explained according to the flow chart shown in FIG. 19. Steps from S601 through S605 in this embodiment are the same as S601 through S605 in the fifth embodiment of the present invention. At S601, the torque distribution controller 120 receives wheel speeds $\omega 1$, $\omega 2$, $\omega 3$ and $\omega 4$, steering wheel angle $\theta$, real yaw rate $\gamma$, status of braking control flag Fvs, status of rear wheel braking selection flag Fvr, yaw rate deflection $\Delta \gamma$, turbine speed Nt, gear ratio i, gear position Lposi, engine speed Ne, engine torque Te, throttle opening angle $\theta$th, and road surface friction coefficient $\mu$, and then the program goes to S602 where basic force FOtb is calculated.

Then the program goes to S603 where it is judged if braking control flag Fvs is established. If not, i.e., the brake controller 40 does not apply braking force to any wheel, the program goes to S604 where basic force FOtb is employed as engaging force of the hydraulic multi-plate clutch (transfer clutch) 21.

If yes at S603, i.e., the case the brake controller 40 applies braking force to a certain wheel, the program goes to S605 where it is judged if rear wheel braking selection flag Fvr is established (Fvr←1).

If not at S605, i.e., the case the brake controller 40 works to change turning characteristics to those unfavorable to turn against over steering, the program goes to S701 where it is judged if basic force FOtb is smaller than strong force FOCH. IF not, i.e., FOtb≧FOCH, the program goes to S702 where basic force FOtb is employed as engaging force of the hydraulic multi-plate clutch (transfer clutch) 21.

If yes at S701, i.e., FOtb<FOCH, the program goes to S703 where strong force FOCH is employed as engaging force of the hydraulic multi-plate clutch (transfer clutch) 21.

Namely, in the steps of S701 through S703, higher one of basic force FOtb and strong force FOCH is employed as engaging force of the hydraulic multi-plate clutch (transfer clutch) 21, when the brake controller 40 works to change turning characteristics to those unfavorable to turn against over steering.

If yes at S605, i.e., the case the brake controller 40 works to change turning characteristics to those favorable to turn against under steering, the program goes to S704 where it is judged if basic force FOtb is larger than weak force FOCL. If not, i.e., FOtb≦FOCL, the program goes to S705 where basic force FOtb is employed as engaging force of the hydraulic multi-plate clutch (transfer clutch) 21.

If yes at S704, i.e., FOtb>FOCL, the program goes to S706 where weak force FOCL is employed as engaging force of the hydraulic multi-plate clutch (transfer clutch) 21.

Namely, in the steps of S704 through S706, lower one of basic force FOtb and weak force FOCL is employed as engaging force of the hydraulic multi-plate clutch (transfer clutch) 21, when the brake controller 40 works to change turning characteristics to those favorable to turn against under steering.

Then the program goes to S608 where the hydraulic multi-plate clutch (transfer clutch) 21 is controlled by engaging force employed at S604, S702, S703, S705 or S706.

Thus, according to the sixth embodiment of the present invention, engaging force of the hydraulic multi-plate clutch (transfer clutch) 21 is more securely controlled on top of the controls in the fifth embodiment of the present invention. Namely when the brake controller 40 works to change turning characteristics to those favorable to turn, lower value is employed as engaging force of the hydraulic multi-plate clutch (transfer clutch) 21 resulting in promoting the control to change turning characteristics to those favorable to turn. And when the brake controller 40 works to change turning characteristics to those unfavorable to turn, higher value is employed as engaging force of the hydraulic multi-plate clutch (transfer clutch) 21 resulting in promoting running stability.

Figure 20:
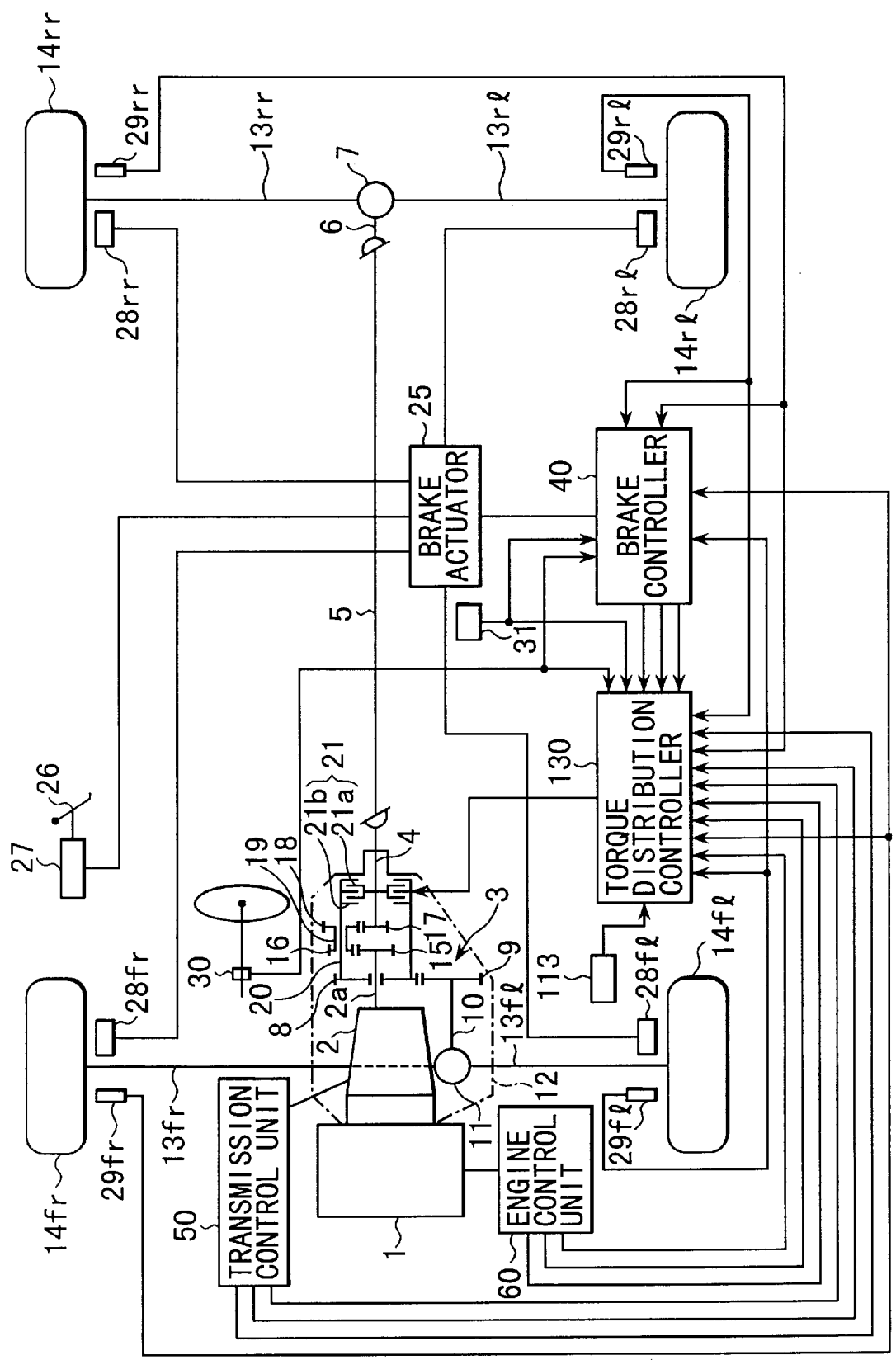
FIG. 20 is an illustration showing vehicle movements by the braking force control according to the $7^{th}$ embodiment of the present invention.
Figure 21:
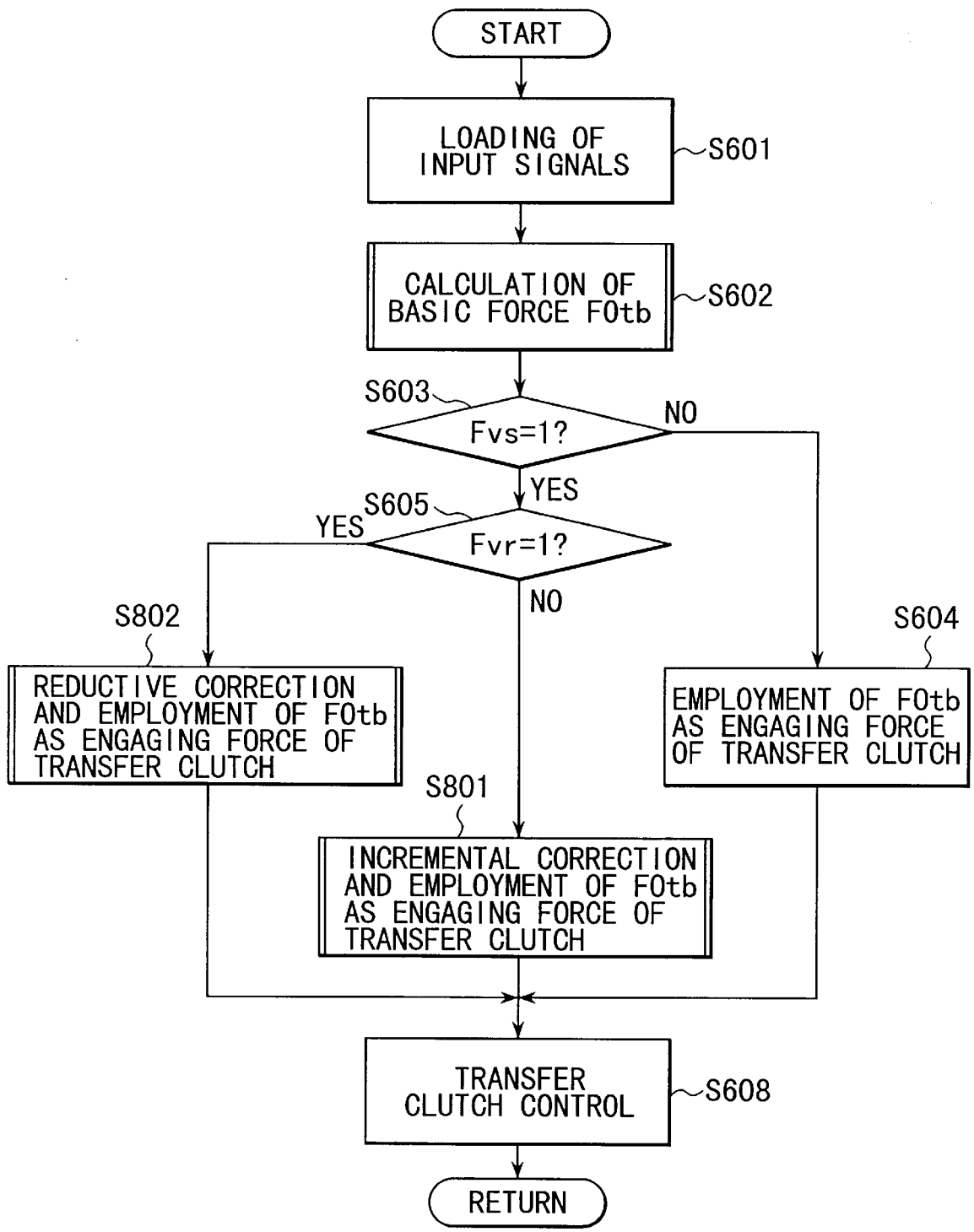
FIG. 21 is a flow chart of torque distribution control according to the $7^{th}$ embodiment of the present invention.

The seventh embodiment of the present invention is shown in FIG. 20 and FIG. 21. FIG. 20 is an illustration showing an overall construction of a 4 wheel driven vehicle equipped with a torque distribution apparatus. FIG. 21 is a flow chart showing torque distribution control. In the seventh embodiment, 4 wheel driven vehicle equipped with an automatic transmission is same as referred to in the fifth embodiment of the present invention. The torque distribution apparatus in the seventh embodiment of the present invention controls engaging force of a hydraulic multi-plate clutch (transfer clutch) by reductive correction of basic force FOtb toward rear heavy torque distribution when the braking force controlling means works to make turning characteristics favorable to turn. On the other hand, the torque distribution apparatus controls engaging force of the hydraulic multi-plate clutch (transfer clutch) by incremental correction of basic force FOtb toward increasing front wheel torque distribution when the braking force controlling means works to make turning characteristics unfavorable to turn.

Accordingly, a torque distribution apparatus 130 in the seventh embodiment of the present invention is similar to the torque distribution apparatus 110 in the fifth embodiment of the present invention as shown in FIG. 20, but control scheme is different.

Operation of the torque distribution controller 130 is explained according to the flow chart shown in FIG. 21. Steps from S601 through S605 in this embodiment are the same as S601 through S605 in the fifth embodiment of the present invention. At S601, the torque distribution controller 130 receives wheel speeds ω1, ω2, ω3 and ω4, steering wheel angle θ, real yaw rate γ, status of braking control flag Fvs, status of rear wheel braking selection flag Fvr, yaw rate deflection Δγ, turbine speed Nt, gear ratio i, gear position Lposi, engine speed Ne, engine torque Te, throttle opening angle θth, and road surface friction coefficient μ, and then the program goes to S602 where basic force FOtb is calculated.

Then the program goes to S603 where it is judged if braking control flag Fvs is established. If not, i.e., the brake controller 40 does not apply braking force to any wheel, the program goes to S604 where basic force FOtb is employed as engaging force of the hydraulic multi-plate clutch (transfer clutch) 21.

If yes at S603, i.e., the case the brake controller 40 applies braking force to a certain wheel, the program goes to S605 where it is judged if rear wheel braking selection flag Fvr is established (Fvr←1).

If not at S605, i.e., the case the brake controller 40 works to change turning characteristics to those unfavorable to turn against over steering, the program goes to S801 where basic force FOtb is incrementally corrected and then employed as engaging force of the hydraulic multi-plate clutch (transfer clutch) 21.

For example, the incremental correction is carried out on basic force FOtb by multiplying a constant factor more than 1, predetermined by experiments or calculations, or adding a constant factor predetermined by experiments or calculations.

If yes at S605, i.e., the case the brake controller 40 works to change turning characteristics to those favorable to turn against under steering, the program goes to S802 where basic force FOtb is reductively corrected and then employed as engaging force of the hydraulic multi-plate clutch (transfer clutch) 21.

For example, the reductive correction is carried out on basic force FOtb by multiplying a constant factor less than 1, predetermined by experiments or calculations, or reducing a constant factor more than 0 predetermined by experiments or calculations.

Then the program goes to S608 where the hydraulic multi-plate clutch (transfer clutch) 21 is controlled by engaging force employed at S604, S801 or S802.

Thus, according to the seventh embodiment of the present invention, engaging force of the hydraulic multi-plate clutch (transfer clutch) 21 is more securely controlled. Namely when the brake controller 40 works to change turning characteristics to those favorable to turn, lower value is employed as engaging force of the hydraulic multi-plate clutch (transfer clutch) 21 resulting in promoting the control to change turning characteristics to those favorable to turn. And when the brake controller 40 works to change turning characteristics to those unfavorable to turn, higher value is employed as engaging force of the hydraulic multi-plate clutch (transfer clutch) 21 resulting in promoting running stability.

Figure 22:
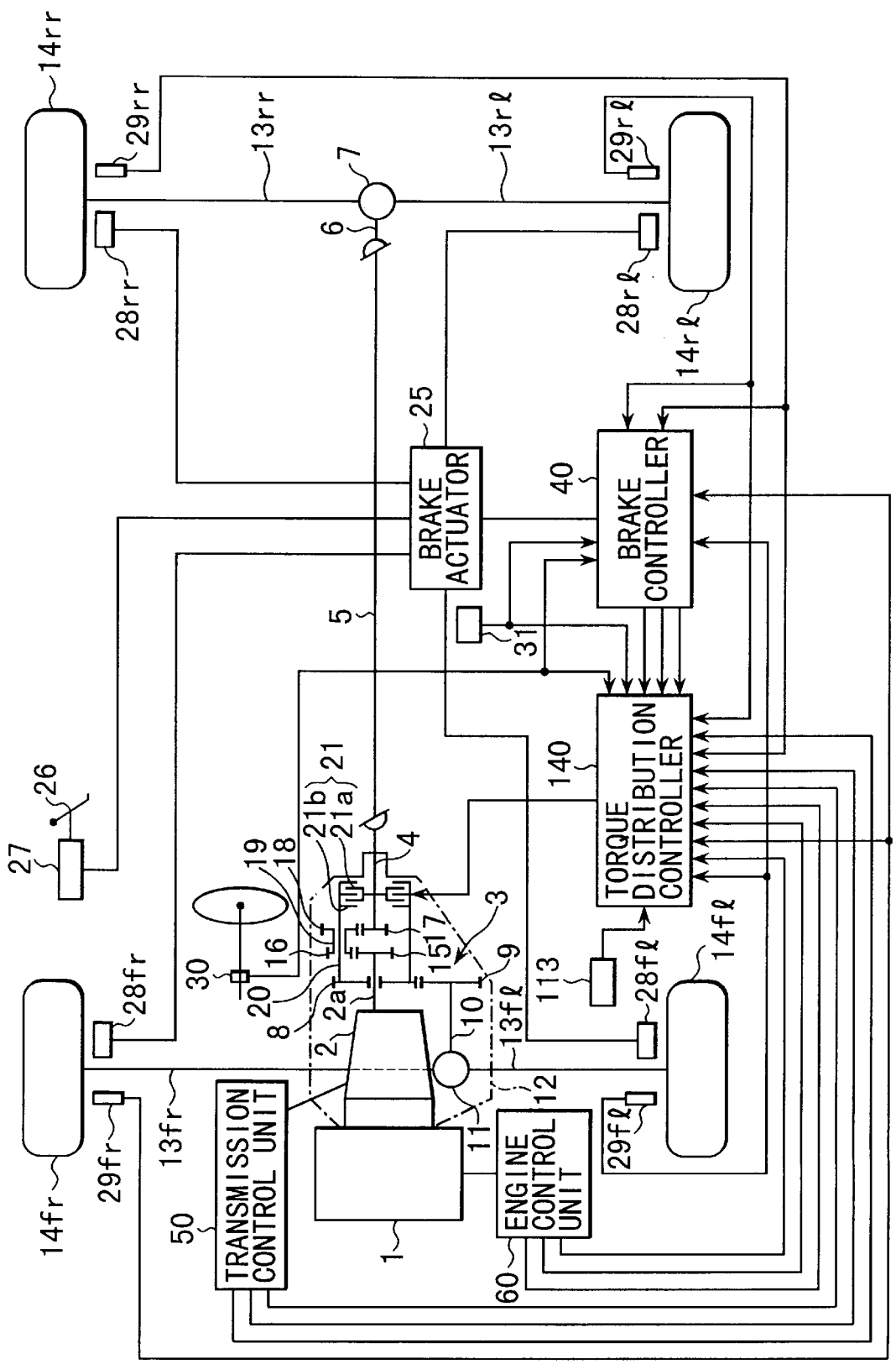
FIG. 22 is an illustration showing vehicle movements by the braking force control according to the $8^{th}$ embodiment of the present invention.
Figure 23:
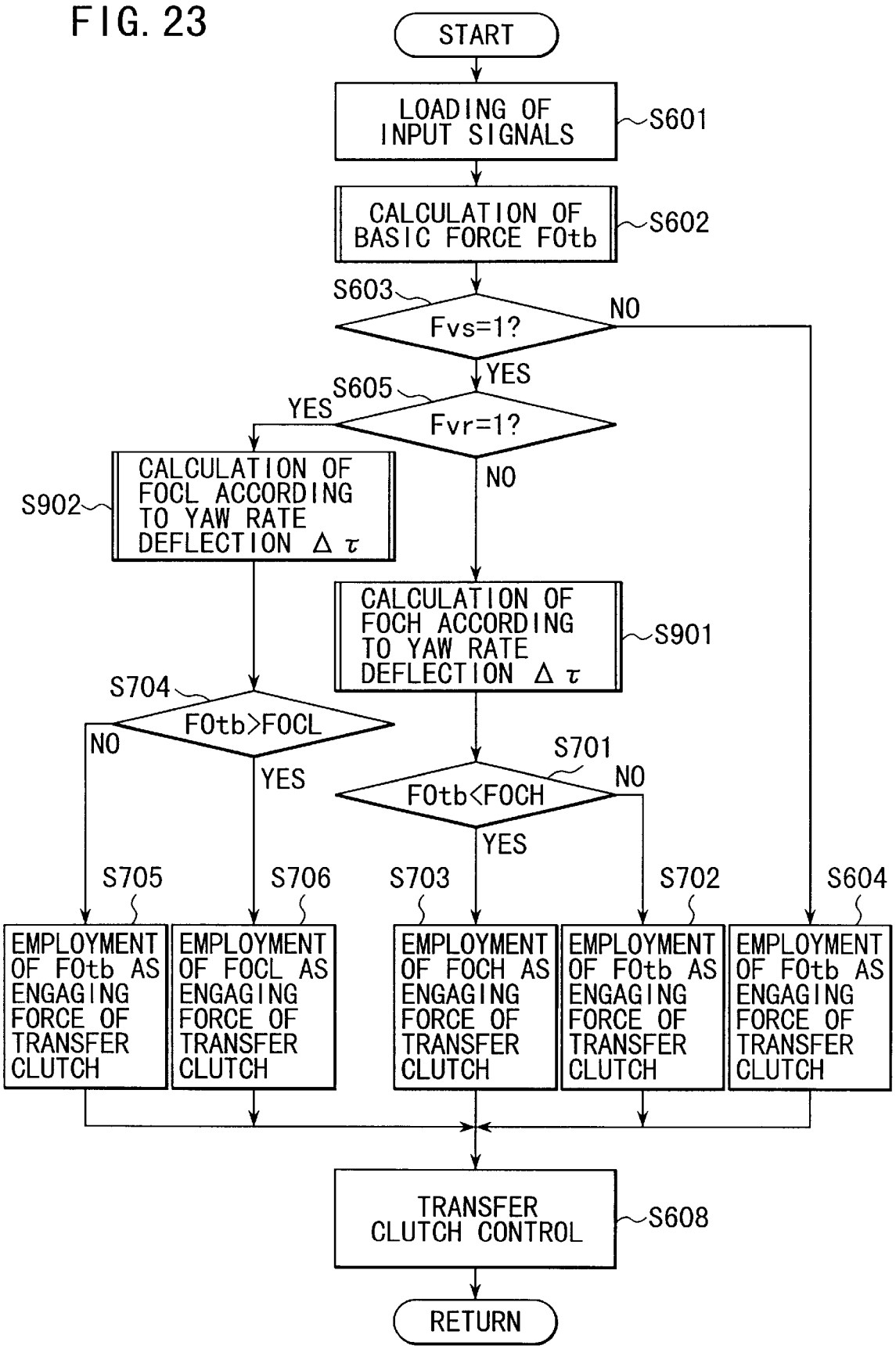
FIG. 23 is a flow chart of torque distribution control according to the $8^{th}$ embodiment of the present invention.

The eighth embodiment of the present invention is shown in FIG. 22 and FIG. 23. FIG. 22 is an illustration showing an overall construction of a 4 wheel driven vehicle equipped with a torque distribution apparatus. FIG. 23 is a flow chart showing torque distribution control. In the eighth embodiment, 4 wheel driven vehicle equipped with an automatic transmission is same as referred to in the sixth embodiment of the present invention. The torque distribution apparatus in the eighth embodiment of the present invention controls engaging force of a hydraulic multi-plate clutch (transfer clutch) with engaging forces comprising strong force FOCH and weak force FOCL which are calculated according to yaw rate deflection Δγ.

Accordingly, a torque distribution apparatus 140 in the eighth embodiment of the present invention is similar to the torque distribution apparatus 120 in the sixth embodiment of the present invention as shown in FIG. 22, but control scheme is different.

Operation of the torque distribution controller 140 is explained according to the flow chart shown in FIG. 23. Steps from S601 through S605 in this embodiment are the same as S601 through S605 in the fifth embodiment of the present invention. At S601, the torque distribution controller 140 receives wheel speeds ω1, ω2, ω3 and ω4, steering wheel angle θ, real yaw rate γ, status of braking control flag Fvs, status of rear wheel braking selection flag Fvr, yaw rate deflection Δγ, turbine speed Nt, gear ratio i, gear position Lposi, engine speed Ne, engine torque Te, throttle opening angle θth, and road surface friction coefficient μ, and then the program goes to S602 where basic force FOtb is calculated.

Then the program goes to S603 where it is judged if braking control flag Fvs is established. If not, i.e., the brake controller 40 does not apply braking force to any wheel, the program goes to S604 where basic force FOtb is employed as engaging force of the hydraulic multi-plate clutch (transfer clutch) 21.

If yes at S603, i.e., the case the brake controller 40 applies braking force to a certain wheel, the program goes to S605 where it is judged if rear wheel braking selection flag Fvr is established (Fvr←1).

If not at S605, i.e., the case the brake controller 40 works to change turning characteristics to those unfavorable to turn against over steering, the program goes to S901 where strong force FOCH is calculated according to yaw rate deflection Δγ and then employed as engaging force of the hydraulic multi-plate clutch (transfer clutch) 21. Then the program goes to S701.

Strong force FOCH is determined at S901, for example, according to formula or map, established by experiments or calculations, depending on yaw rate deflection Δγ. To raise control efficiency, FOCH is determined to the higher value, the higher Δγ is.

At S701 it is judged if basic force FOtb is smaller than strong force FOCH. IF not, i.e., FOtb≧FOCH, the program goes to S702 where basic force FOtb is employed as engaging force of the hydraulic multi-plate clutch (transfer clutch) 21.

If yes at S701, i.e., FOtb<FOCH, the program goes to S703 where strong force FOCH is employed as engaging force of the hydraulic multi-plate clutch (transfer clutch) 21.

If yes at S605, i.e.,the case the brake controller 40 works to change turning characteristics to those favorable to turn against under steering, the program goes to S902 where weak force FOCL is determined according to yaw rate deflection Δγ. Then the program goes to S704.

Weak force FOCL is determined at S902, for example, according to formula or map, established by experiments or calculations, depending on yaw rate deflection Δγ. To raise control efficiency, FOCL is determined to the lower value, the higher Δγ is.

At S704 it is judged if basic force FOtb is larger than weak force FOCL. If not, i.e., FOtb≦FOCL, the program goes to S705 where basic force FOtb is employed as engaging force of the hydraulic multi-plate clutch (transfer clutch) 21.

If yes at S704, i.e., Fotb>FOCL, the program goes to S706 where weak force FOCL is employed as engaging force of the hydraulic multi-plate clutch (transfer clutch) 21.

Then the program goes to S608 where the hydraulic multi-plate clutch (transfer clutch) 21 is controlled by engaging force employed at S604, S702, S703, S705 or S706.

Thus, according to the eighth embodiment of the present invention, engaging force of the hydraulic multi-plate clutch (transfer clutch) 21 is more precisely controlled corresponding to vehicle running condition, because weak and strong forces FOCL and FOCH are determined according to yaw rate deflection Δγ.

Needless to say, these controls are also applicable to the system disclosed in the fifth embodiment of the present invention.

If one of weak and strong forces FOCL and FOCH is taken to be determined according to yaw rate deflection Δγ, it can work.

Method of braking force control, types of center differential and type of hydraulic multi-plate clutch (transfer clutch) described in respective embodiments of the present invention may be other method and types.

The variables and parameters recited in respective embodiments of the present invention may not be obtained in the same manner as described. Some may be obtained by communication from other control system. Some may be calculated instead of directly detecting. Some may be directly detected in stead of calculation.

Needless to say, basic force FOtb to be employed as engaging force of the hydraulic multi-plate clutch (transfer clutch) 21 may be determined by other method. If application of the present invention is only for one side of changing turning characteristics to those favorable or unfavorable when braking control is carried out, it is possible to promote effectiveness of the control for that side.

In the case that a brake controller is installed to a 4 wheel driven vehicle, application of the present invention makes braking force control effective enough so that running stability of the 4 wheel driven vehicle at cornering can be up-graded.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A torque distribution control apparatus of a four wheel drive vehicle, the vehicle comprising an engine mounted on said vehicle for supplying a driving force to front wheels and rear wheels respectively of the vehicle, an automatic gear train (2) mounted on said vehicle and mechanically connected to said engine for changing a speed of the vehicle and for transmitting a driving force to each of said wheels, a center differential mechanically interposed between said automatic gear train and said front and said rear wheels for changing a torque distribution ratio between said front and said rear wheels, a brake actuator hydromechanically connected to all of said wheels for stopping a rotation of any of said wheels by wheel cylinders installed on the vehicle for respective ones of said wheels, wheel speed sensors provided near said wheels for detecting speeds of respective ones of said wheels, and for generating respective wheel speed signals, and vehicle driving control means responsive to said wheel speed signals for controlling said vehicle under driving conditions, said torque distribution control apparatus comprising:

braking force control means connected to said brake actuator for controlling a braking force to each of said wheels, and for generating a braking force control signal; and a torque distribution controller responsive to said braking force control signal for establishing a smaller engaging force to said center differential than a usual value of engaging force upon application of said braking force to said front wheels or said rear wheels so as to stabilize controllability of said vehicle upon cornering by increasing a free rotation of said wheels, and to improve a response characteristic during a running of the vehicle on a road.

2. A torque distribution control apparatus of a four wheel drive vehicle, the vehicle comprising an engine mounted on said vehicle for supplying a driving force to front wheels and to rear wheels of the vehicle, an automatic gear train mounted on said vehicle and mechanically connected to said engine for changing a speed of the vehicle, and for transmitting a driving force to each of said wheels, a center differential mechanically interposed between said automatic gear train and said front and said rear wheels for changing a torque distribution ratio between said front and said rear wheels, a brake actuator hydro-mechanically connected to said wheels for stopping a rotation of any of said wheels by wheel cylinders installed on the vehicle for respective ones of said wheels, wheel speed sensors provided near said wheels for detecting speeds of respective ones of said wheels and for generating respective wheel speed signals, an acceleration sensor (81) mounted on said vehicle for detecting an acceleration in a running direction of said vehicle and for generating a longitudinal acceleration signal, and a vehicle driving controller responsive to said wheel speed signals for controlling said vehicle under driving conditions, said torque distribution control apparatus comprising:

braking force control means connected to said brake actuator for controlling an optimum braking force to each of said wheels and for generating a braking force control signal; and torque distribution controller responsive to said longitudinal acceleration signal and said braking force control signal for calculating a weight distribution for said front and said rear wheels upon application of said braking force to said front wheels or said rear wheels, and for producing a weight distribution signal; wherein said torque distribution controller is operated responsive to said weight distribution signal for applying an engaging force to said center differential in accordance with a predetermined equation based upon said weight distribution so as to stabilize a controllability of said vehicle in various driving conditions and to improve a response characteristic during a running of the vehicle on a road.

3. A torque distribution control apparatus of a four wheel drive vehicle, the vehicle comprising an engine mounted on said vehicle for supplying a driving force to front wheels and to rear wheels of the vehicle, an automatic gear train mounted on said vehicle and mechanically connected to said engine for changing a speed of the vehicle and for transmitting a driving force to each of said wheels, a center differential mechanically interposed between said automatic gear train and said front and said rear wheels for changing a torque distribution ratio between said front and said rear wheels, a brake actuator hydromechanically connected to all of said wheels for stopping a rotation of any one of said wheels by wheel cylinders installed on the vehicle for respective ones of said wheels, wheel speed sensors provided near said wheels for detecting speeds of respective ones of said wheels and for generating respective wheel speed signals, an acceleration sensor mounted on said vehicle for detecting an acceleration in a running direction of said vehicle and for generating a longitudinal acceleration signal, and a vehicle driving controller responsive to said wheel speed signals for controlling said vehicle under driving conditions, said torque distribution control apparatus comprising:

braking force control means connected to said brake actuator for controlling a braking force to each of said wheels, and for generating a braking force control signal; and a torque distribution controller responsive to said longitudinal acceleration signal and said braking force control signal for calculating a turning capability of said vehicle when said braking force is applied to at least one of said front wheels and said rear wheels while turning and for producing a turning capability signal; wherein said torque distribution controller is operated responsive to said turning capability signal for applying an engaging force to said center differential in accordance with a turning capability of said vehicle so as to stabilize a controllability of said vehicle in over-steering or under-steering conditions, and to improve a response characteristic during a running of the vehicle on a road.

4. The torque distribution control apparatus according to claim 3, wherein torque distribution to said rear wheels is modified so as to increase at changing turning characteristics to those favorable to turn as a result of said application of said braking force to a respective one of said wheels by said braking force control means.

5. The torque distribution control apparatus according to claim 4, wherein torque distribution to said rear wheels is modified so as to increase with a predetermined value at changing turning characteristics to those favorable to turn as a result of said application of said braking force to a respective one of said wheels by said braking force control means.

6. The torque distribution control apparatus according to claim 4, wherein torque distribution to said rear wheels is modified so as to increase according to deflection of real yaw rate and aimed yaw rate at changing turning characteristics to those favorable to turn as a result of said application of said braking force to a respective one of said wheels by said braking force control means.

7. The torque distribution control apparatus for 4 wheel driven vehicle according to claim 3, wherein the apparatus is operative to modify torque transmission to said front wheels, increasing torque at changing turning characteristics to those unfavorable to turn as a result of said application of said braking force to a respective one of said wheels by said braking force controlling means.

8. The torque distribution control apparatus for 4 wheel driven vehicle according to claim 7, wherein the apparatus is operative to increase a torque distribution ratio to said front wheels to a predetermined value, at changing turning characteristics, to those unfavorable to turn as a result of said application of said braking force to a respective one of said wheels by said braking force controlling means.

9. The torque distribution control apparatus for 4 wheel driven vehicle according to claim 7, wherein the apparatus is operative to modify torque transmission to said front wheels to increase torque according to deflection of real yaw rate and aimed yaw rate, at changing turning characteristics, to those unfavorable to turn as a result of said application of said braking force to a respective one of said wheels by said braking force controlling means.

* * * * *